(12) United States Patent
Garg et al.

(10) Patent No.: US 12,007,877 B1
(45) Date of Patent: Jun. 11, 2024

(54) VISUAL QUERY LANGUAGE FOR CODE REVIEW RULES

(71) Applicant: Amazon Technologies, Inc., Seattle, WA (US)

(72) Inventors: Pranav Garg, Secaucus, NJ (US); Sengamedu Hanumantha Rao Srinivasan, Seattle, WA (US); Omer Tripp, San Jose, CA (US); Abhin Sharma, Seattle, WA (US)

(73) Assignee: Amazon Technologies Inc., Seattle, WA (US)

( * ) Notice: Subject to any disclaimer, the term of this patent is extended or adjusted under 35 U.S.C. 154(b) by 107 days.

(21) Appl. No.: 17/708,269

(22) Filed: Mar. 30, 2022

(51) Int. Cl.
 *G06F 9/44* (2018.01)
 *G06F 11/36* (2006.01)

(52) U.S. Cl.
 CPC ...... *G06F 11/3664* (2013.01); *G06F 11/3688* (2013.01)

(58) Field of Classification Search
 CPC .................... G06F 11/3664; G06F 11/3688
 USPC ................................ 717/110–113, 124–125
 See application file for complete search history.

(56) References Cited

U.S. PATENT DOCUMENTS

| | | | | |
|---|---|---|---|---|
| 7,158,511 | B2 * | 1/2007 | Payton | H04L 45/243 370/389 |
| 9,361,077 | B1 * | 6/2016 | Hale | G06F 16/245 |
| 9,594,544 | B2 * | 3/2017 | Wang | G06F 8/38 |
| 9,600,275 | B2 * | 3/2017 | Fan | G06F 8/73 |
| 10,353,701 | B2 * | 7/2019 | Atanasiu | G06F 8/38 |

OTHER PUBLICATIONS

Micro Focus, "DevPartner Java Edition Code Review—User's Guide", 2009, Micro Focus (IP) Ltd., pp. 1-90. (Year: 2009).*
He et al., "Supporting Automatic code Review Via Design Pattern", 2013, IEEE, pp. 211-218. (Year: 2013).*
Huang et al., "CLDiff: Generating Concise Linked Code Differences", 2018, ACM, pp. 679-690. (Year: 2018).*
Rao et al., "Customizable Service for Recommendations on Source Code Quality", Unpublished Co-Pending U.S. Appl. No. 16/836,382, filed Mar. 31, 2020, 62 pages.
Tripp et al., "Data Flow Tracking in Program Verification", Unpublished Co-Pending U.S. Appl. No. 17/218,590, filed Mar. 31, 2021, 56 pages.
Hu et al., "Transformer-Based Bug Fixing", Unpublished Co-Pending U.S. Appl. No. 17/545,770, filed Dec. 8, 2021, 53 pages.

* cited by examiner

*Primary Examiner* — Ted T. Vo
(74) *Attorney, Agent, or Firm* — Nicholson DeVos Webster & Elliott LLP

(57) ABSTRACT

Techniques for providing a visual code review editor are described. An electronic device is caused to display a graphical user interface including an editor portion to edit code review rules used by a code review service of a cloud provider network. The editor portion of the graphical user interface is caused to display a first graph associated with a first code review rule, the first graph including a first node, a second node, and a first edge connecting the first node and the second node. An indication that a third node has been added to the graph via the editor portion of the graphical user interface is received. The first code review rule is updated by the code review service to reflect the addition of the third node, the first code review rule is in a text format.

20 Claims, 20 Drawing Sheets

Rule: $R \stackrel{def}{=} \exists \vec{x}. pre(\vec{x}) \wedge \neg (\bigvee_j \exists \vec{y}. post_j(\vec{x}, \vec{y}))$, where
$pre(\vec{x}) \in \varphi(\vec{x})$, and $post_j(\vec{x}, \vec{y}) \in \varphi(\vec{x}, \vec{y})$ Conjunctive
Subrule: $\varphi(\vec{x}) ::= \bigwedge_i \varphi^i(\vec{x}) \mid e(\vec{x}) \mid \eta(\vec{x}) \mid \text{True} \mid \text{False}$
Edge predicate: $e(\vec{x}) ::= x_1 \xrightarrow{e} x_2$
Node predicate: $\eta(\vec{x}) ::= label(x) = l \mid data\text{-}type(x) = R$
$\mid data\text{-}value(x) = s \mid num\text{-}para(x) = i$
$\mid declaring\text{-}type(x) = R$
$\mid trans\text{-}control\text{-}dep(x) \supseteq \geq Label$
$\mid output\text{-}ignored(x) \mid \neg output\text{-}ignored(x)$ $\vec{x} = \{x_1, \ldots\}, \vec{y} = \{y_1, \ldots\}, x_i, y_i \in Var, l \in Label,$
$s \in String, i \in Int, R$ is regular expression,
$e \in \{recv, para, def, dep, throw\}$

FIG. 4

```
CODE EXAMPLE WITH CHANGES 501
1   ...
2   Cursor cursor = cr.query(....);
3 - cursor.moveToFirst();
4 + if (!cursor.moveToFirst()) {
5 +     cursor.close();
6 +     return null;
7 + }
8   final String id = cursor.getString(0);
```
```
CODE EXAMPLE WITH CHANGES 502
1   ...
2 - mProviderCursor.moveToFirst();
3 + if (!mProviderCursor.moveToFirst()) {
4 +     return;
5 + }
6   do {
7       if(mProviderCursor.getLong(...) == id) {
8   ...
```
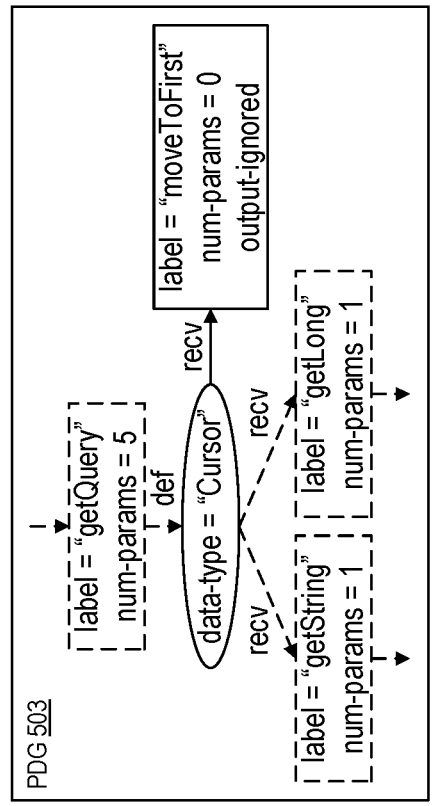
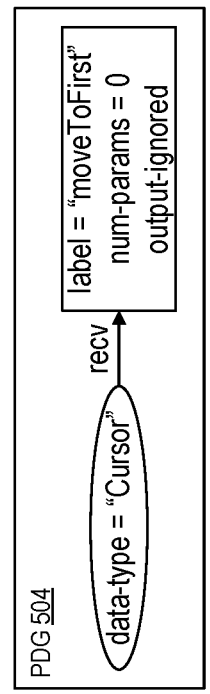
FIG. 5

$R = \exists x_0, x_1. \{pre(x_0, x_1) \land$
$\neg(\exists y_1, \ldots, y_4. post_1(x_0, x_1, y_1, \ldots, y_4) \lor$
$\exists y_1, \ldots, y_6. post_2(x_0, x_1, y_1, \ldots, y_6))\}$, where $pre(x_0, x_1) := data\text{-}type(x_0) = "Cursor" \land$
$label(x_1) = "moveToFirst" \land num\text{-}para(x_1) = 0 \land$
$output\text{-}ignored(x_1) \land x_0 \xrightarrow{recv} x_1$ $post_1(x_0, x_1, y_1, \ldots, y_4) := label(y_1) = "isAfterLast" \land$
$num\text{-}para(y_1) = 0 \land label(y_3) = "?" \land$
$data\text{-}type(y_4) = "boolean" \land x_0 \xrightarrow{recv} y_1 \land$
$y_1 \xrightarrow{def} y_2 \land y_2 \xrightarrow{para0} y_3 \land y_3 \xrightarrow{def} y_4$ $post_2(x_0, x_1, y_1, \ldots, y_6) := label(y_1) = "getCount" \land$
$num\text{-}para(y_1) = 0 \land data\text{-}type(y_3) = "int" \land$
$label(y_4) = "<rel\_op>" \land data\text{-}type(y_6) = "IF" \land$
$x_0 \xrightarrow{recv} y_1 \land y_1 \xrightarrow{def} y_2 \land y_2 \xrightarrow{para0} y_4 \land y_3 \xrightarrow{para1} y_4 \land$
$y_4 \xrightarrow{def} y_5 \land y_5 \xrightarrow{cond} y_6 \land y_6 \xrightarrow{dep} x_1$

VISUAL QUERY LANGUAGE FOR CODE REVIEW RULES

BACKGROUND

More and more companies are now incorporating computers and software services into many facets of their business. These companies are using software to provide more and more complex services. The complexity of these services has, in turn, increased the functionality required from the software that provides these services. Thus, software projects have become more complex and software development of large applications is typically a lengthy process, requiring multiple developers many months to complete development. The increased complexity in the software development process has made the task of administering and managing software challenging.

BRIEF DESCRIPTION OF DRAWINGS

Various embodiments in accordance with the present disclosure will be described with reference to the drawings, in which:

FIG. 4 illustrates an exemplary way of defining code review rules in logic according to some embodiments.

FIGS. 5-7 illustrates an exemplary synthesis of a code review rule according to some embodiments.

DETAILED DESCRIPTION

Figure 1:
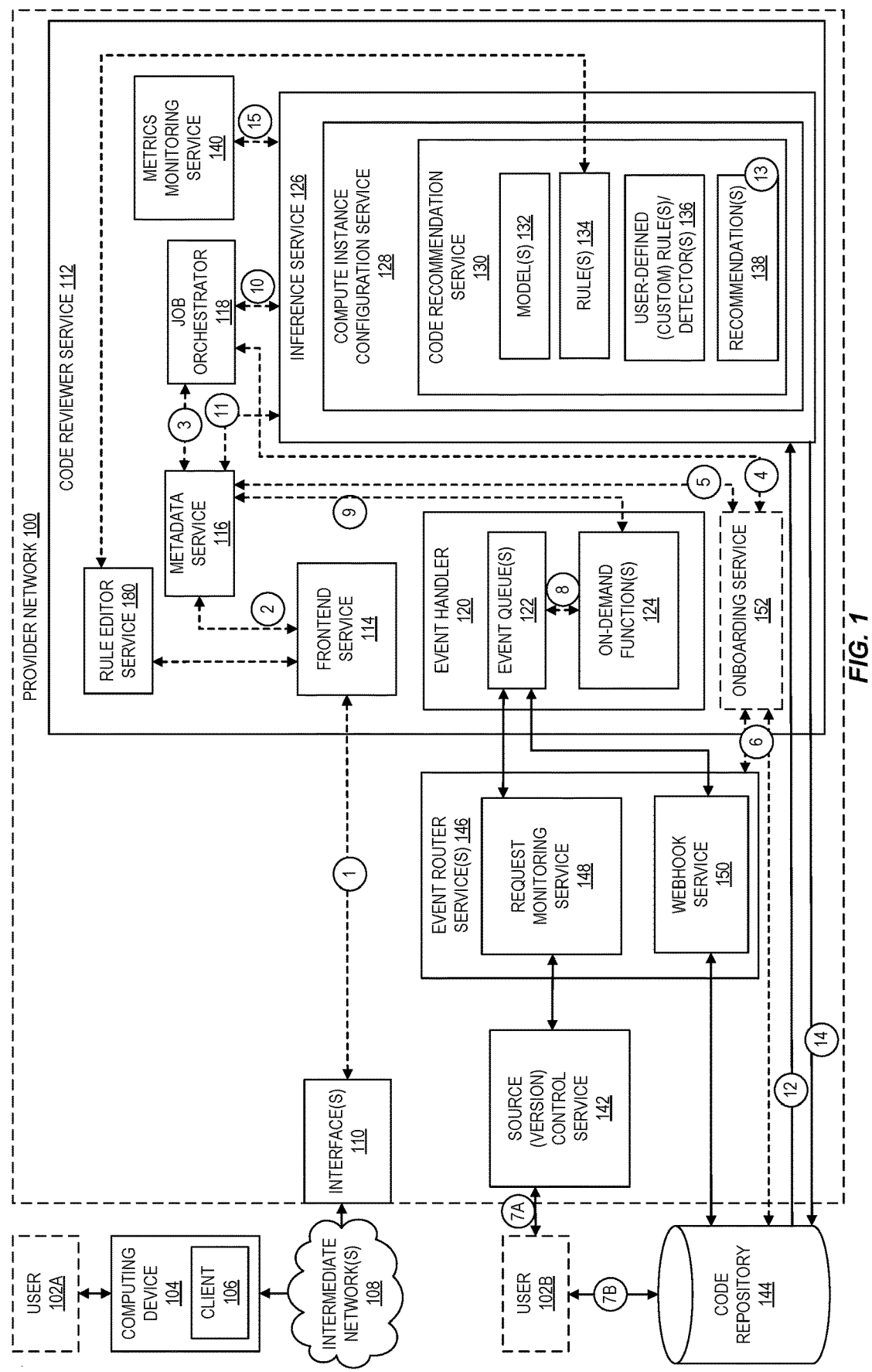
FIG. 1 is a diagram illustrating an environment for a code reviewer service according to some embodiments.

The present disclosure relates to methods, apparatus, systems, and non-transitory computer-readable storage media for providing graph-based editing of code review rules used to evaluate code by a code reviewer service to improve code quality and security. Ensuring code quality is one of the most pressing problems faced by the software industry today. Lack of reliability and maintainability in production code can cause defects ranging from minor usability problems to causing an application to be unavailable for an extended period of time. Inconsistent coding practices and readability issues further delay remediation. A code reviewer service disclosed herein allows a developer (e.g., team(s) thereof) to improve the quality of their code and reduce the manual effort required for code reviews by taking advantage of actionable recommendations generated by the code reviewer service. A code reviewer service can, upon a user's request, quickly and accurately identify one or more predicted issues of source code and provide respective recommendation(s) to alleviate the predicted issues. The code reviewer service uses generalized code review rules (or simply "rules") that can be used to areas of code improvement (e.g., buggy code, bad coding practices, etc.). In this manner, a code reviewer service helps users (e.g., developers) to write high quality (e.g., source) code and increases their productivity by providing recommendations during code reviews.

Having a robust set of rules for the code reviewer service to evaluate is an important part of improving code quality. As different developers and organizations may have different code review needs, providing users with an intuitive way to create and edit rules suitable for their needs is an important part of improving code quality. Graph-based representation of rules presents an intuitive way for visualizing rules and thus for creating and/or editing them.

Certain embodiments disclosed herein provide a Visual Query Language (VQL) to create and/or modify a graph-based representation of code review rules. Certain embodiments of VQL disclosed herein use the node and edge abstractions of a graph to allow visual editing of rules and can be no-code and declarative. Such a graph-based editing approach is more intuitive than existing text-based editing approaches. Existing rule creation and editing approaches rely on text-based languages such as Guru Query Language (GQL). GQL is an imperative domain-specific language based on the Java Builder design pattern. A GQL rule linearizes a graph pattern as a set of paths in the graph that cover all edges and are expressed as a sequence of Builder calls. As a node can be present in multiple paths of a graph, the information about edges incident at a node in GQL is not localized in one place but is distributed in different parts of the rule. As a result, editing in a text-based format can be cumbersome.

In certain embodiments, a VQL rule consists of a set of precondition graphs and a set of postcondition graphs. These graphs are templatized over a predefined set of node and edge predicates (e.g., GQL predicates). The graph nodes are tagged with variables such as $\vec{x}, \vec{y}$ and correspond to existentially quantified formulas over graphs. The set of precondition and postcondition graphs are disjoined to form the respective rule preconditions and postconditions in disjunctive normal form (DNF). In some embodiments and as a syntactic sugar, users can express disjunctive rule preconditions and postconditions in CNF form, which is more succinct, using different line styles and/or line colors in the same graph. In some embodiments, inter-procedural flows in VQL are expressed through edges that track data-dependencies across procedure boundaries. In some embodiments, VQL rules can be further refined by specifying a set of file-level or class-level predicates.

Since a VQL is a visual language, VQL rules can be authored in a graphical user interface (GUI) by drawing graph patterns and choosing node and edge predicates. An exemplary VQL GUI supports adding, deleting or editing nodes, node predicates and edges. Additionally, such a GUI may support copy-and-paste functionality for easily creating graph-based rules that differ slightly from existing ones. Such a GUI could support discovery of appropriate predicates by enumerating node or edge predicates that hold at a given node or relate two nodes in the graph, respectively.

As used herein, the term "code repository" may generally refer to a source code repository that is hosted, for example, by a user or by a repository provider. As used herein, the term "pull request" may generally refer to a request that indicates the changed artifacts that a developer has made to a repository (e.g., branch) and shares that with other developers and services for various purposes (e.g., code review, merge, and/or recommendations). As used herein, the term "inference" may generally refer to the process of running a code recommendation service on a customer's code to generate recommendations. As used herein, "rules" may be a human curated and defined set of rules used to provide recommendations on a code repository. In certain embodiments, rules do not involve any machine learning, for example, but do utilize a dataset to run and validate the rules.

FIG. 1 is a diagram illustrating an environment for a code reviewer service according to some embodiments. In this exemplary environment, a code reviewer service 112 includes a frontend service 114, a metadata service 116, a job orchestrator 118, an event handler 120, and an inference service 126. Code reviewer service 112 may include a metrics monitoring service 140 and/or an onboarding service 152. In certain embodiments, code reviewer service 112 receives a request to perform a review of source code, and uses the services and/or workflow systems therein to generate one or more recommendations 138.

In certain embodiments, frontend service 114 is the service that a customer uses (e.g., calls directly) via application programming interface (API) calls, via a console implemented as a website or application, etc. In one embodiment, this is the entry point for all the API calls that support onboarding and an on-demand inference for code review. In one embodiment, frontend service 114 is a (e.g., public facing) gateway that internally calls metadata service 116, and the metadata service 116 implements the different internal calls to the various components for the API calls. In one embodiment, frontend service 114 converts the user API calls to internal API calls of code reviewer service 112. An API may generally refer to an interface and/or communication protocol between a client and a server, such that if the client makes a request in a predefined format, the client should receive a response in a specific format or initiate a defined action. In a cloud provider network context, APIs can provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In certain embodiments, metadata service 116 is an (e.g., internal to code reviewer service 112 and not exposed to the user) control plane service that manages and keeps track of repository associations, on-demand recommendations, pull-requests, and/or feedback. In one embodiment, metadata service 116 provides an internal set of API calls that implement user (e.g., public) API calls and are called by frontend service 114. In one embodiment, metadata service 116 provides various internal APIs called by other (e.g., asynchronous) workflows such as onboarding and inference to manage and track related metadata. In certain embodiments, metadata service 116 is the service that manages all the metadata within code reviewer service 112. The term "metadata" may generally refer to data that provides information about other data.

In certain embodiments, job orchestrator 118 (e.g., job sweeper) is to sweep enqueued tasks for onboarding and inference, and trigger corresponding workflows. In one embodiment, the workflows are executed using a workflow service (e.g., workflow service 200 in FIG. 2) (e.g., a workflow service that builds distributed application using visual workflows) which runs various tasks depending on the workflow type.

In certain embodiments, event handler 120 (e.g., event handler service) is responsible for monitoring (e.g., event queue(s) 122) and processing various events such as pull-requests from customer code repositories, feedback on recommendations, etc. In one embodiment, event handler 120 performs validation of an event and then routes the event to its corresponding workflow (e.g., onboarding, inference, etc.) via metadata service 116.

In certain embodiments, onboarding service 152 is responsible for handling onboarding workflows which includes various steps to associate a code repository with code reviewer service 112. In one embodiment, onboarding service 152 sets up resources (webhooks, service linked role (SLR), etc.) used to monitor various events (e.g., pull requests, feedbacks) on a user's (e.g., customer's) repositories. In one embodiment for a pull request, onboarding service 152 checks that code reviewer service 112 (e.g., inference service 126 thereof) can be run and then posts recommendations as comments on the pull request. In one embodiment, onboarding service 152 sets up a pull request notification configuration with code repository 144 and/or a source code access configuration with code repository 144.

In certain embodiments, inference service 126 is responsible for running an inference on code, e.g., either for a pull request or on-demand for a code repository. In one embodiment for pull requests, inference service 126 posts recommendations 138 as comments on the pull request. In one embodiment for an on-demand request, inference service 126 stores the recommendations 138 (e.g., without any source code or source code snippets) which are then served (e.g., provided) via an inference API call.

In certain embodiments, environment in FIG. 1 includes a code repository 144 (e.g., and includes a code repository service to manage the code repository). Code repository 144 may be separate from code reviewer service 112 (e.g., separate from provider network 100). In one embodiment, code reviewer service 112 is to interact with code repository 144 (e.g., code repository service) to fetch the source code to be reviewed and any metadata to be utilized.

In certain embodiments, provider network 100 includes one or more event router services 146 to route the events happening in code repository 144 (e.g., an event of a pull request, feedback, etc.) to code reviewer service 112. The implementation of an event router service 146 can differ based on the type of code repository providers. For example, for an external code repository, event router service 146 may include a webhook service 150 that is responsible for routing the events into event handler 120 (e.g., event queue 122 thereof) of code reviewer service 112. As another example for an external code repository, event router service 146 may include a request monitoring service 148 with a rule configured to cause detection of an event to be sent to event handler 120 (e.g., event queue 122 thereof) of code reviewer service 112. In one embodiment, an event is an update of source code as indicated by source (e.g., version) control service 142, and request monitoring service 148 sends a corresponding event indication to event handler 120 (e.g., event queue 122 thereof) of code reviewer service 112.

As one example, a customer can configure the code reviewer service 112 to generate one or more recommendations 138 for source code repository 144 by setting up: (1)

a pull request inference where a customer can onboard a given repository so that code reviewer service 112 posts code recommendations 138 on every pull request on that repository 144 and/or (2) an on-demand inference where a user's request (e.g., via a Create Recommendation Job API call) triggers an inference on a (e.g., entire) code repository 144 to create recommendations 138.

In certain embodiments, a code repository is onboarded by onboarding service 152 for monitoring by a customer providing a request that includes an identifier of the source code. In one embodiment, the user's request for an on-demand inference results in an asynchronous job with a job identification (ID) that fetches the source code from the repository 144 and performs an inference on the source code. In certain embodiments, once the job finishes, the customer can view code recommendations generated by the job, e.g., in a console or by a request (e.g., via a List Recommendations API call) that includes the job ID.

In certain embodiments, a customer can use an on-demand inference before and/or after onboarding the code repository for monitoring and code reviewing. In one embodiment, when a customer wants to enable recommendations on every pull request on their code repository in a code repository, they are to onboard their code repository by associating their code repository with the code reviewer service. This onboarding may include setting up the desired resources in provider network 100 (e.g., in code reviewer service 112 and/or event router services 146) and a customer's account that enables monitoring of the pull requests on their repository, running inference, and posting recommendations as comments on the pull request.

In one embodiment, onboarding is logically divided into two parts: (1) where a customer associates a particular repository as a repository to be monitored and (2) an onboarding workflow.

In certain embodiments of "(1) where a customer associates a particular repository as a repository to be monitored", a customer performs an associate repository API call. This may include selecting a repository (e.g., via a console) and calling the associate repository API. This may vary depending on the source control service (e.g., system) where the repository is being hosted. For example, when a customer lands on a coder reviewer console, the console may use a console impersonation token to list the one or more repositories accessible by the customer. Once a customer selects a repository, the console may then perform an associate repository API call signed using customer credentials. As another example, when a customer wants to enable code reviewing on its code repositories via a code reviewer console of code reviewer service 112, the customer may perform an authorization handshake (e.g., according to an industry-standard protocol) and provide the code reviewer service 112 an authorization token from the authorization handshake. Code reviewer service 112 may use this token to list the one or more repositories hosted for that user, and once a customer selects a repository, the console may then call (e.g., frontend service 114) associate repository API along with the token identifier (e.g., the identifier for the authorization token stored in the database). In one embodiment for calling an associate repository API, a customer is to create a personal access token (PAT) for the repository and pass it to associate repository API input.

In certain embodiments of "(2) an onboarding workflow", when a customer successfully calls an associate repository API on the frontend service 114, the code reviewer service 112 will enqueue a task with job orchestrator 118. In one embodiment, the job orchestrator 118 will then pick up this task and trigger a workflow for creating/configuring resources in a customer's account. Once the workflow successfully finishes, the repository association status will change to indicate "associated" and the customer onboarding is now successfully completed.

In certain embodiments, the type of resources created/configured by code reviewer service 112 depends on the customer's code repository (e.g., repository provider). In one embodiment, code reviewer service 112 supports a code repository hosted within provider network 100 or a code repository hosted external from provider network 100.

In certain embodiments, code reviewer service 112 supports a code repository that is managed by source (e.g., version) control service 142. Source (e.g., version) control service 142 may be hosted within provider network or external from provider network 100.

In one embodiment where code reviewer service 112 supports a code repository that is managed by source (e.g., version) control service 142, code reviewer service 112 is to create: a service linked role (SLR) where code reviewer service 112 is to use and assume this SLR during inference to clone the code repository, a system tag where code reviewer service's 112 SLR policy would only provide access to repositories with that system tag, and/or a managed rule in request monitoring service 148 to cause an event indication to be sent to event handler 120 (e.g., event queue 122 thereof) when a change (e.g., pull request) for the code repository is detected by request monitoring service 148.

In one embodiment where code reviewer service 112 supports a code repository that is managed separately from provider network 100, code reviewer service 112 is to: cause onboarding service 152 to call the repository's API (e.g., representational state transfer (REST) API) to configure the webhook for the Uniform Resource Locator (URL) of the code repository, create a webhook configuration in webhook service 150 to cause an event indication to be sent to event handler 120 (e.g., event queue 122 thereof) when a change (e.g., pull request and/or pull request comment) for the code repository is detected by webhook service 150.

In certain embodiments, after the onboarding such that all the resources (e.g., webhooks, SLRs etc.) are setup for the given repository of the customer, event handler 120 receives notifications once a pull request is posted on that repository. In one embodiment, the event handler 120 will then fetch the required metadata about the repository from the code repository 144 and then will call create recommendation job API of metadata service 116 to enqueue a job, e.g., with job orchestrator 118. In one embodiments job orchestrator 118 runs an inference task for the job with inference service 126 to generate code recommendations 138 (e.g., and posts the code recommendations 138 on the pull request).

In certain embodiments, a user (e.g., customer) sends an on-demand inference request for a (e.g., entire) code repository (e.g., via an API call to front end service 114) that triggers an inference job on a given code repository. In one embodiment, a user accessible API call (e.g., not limited to being an internally used API call of code reviewer service 112) is sent to the frontend service 114 that in turns calls a create recommendation job API of metadata service 116 to enqueue the job, e.g., with job orchestrator 118. In one embodiment, job orchestrator 118 runs an inference task for the job with inference service 126 to generate code recommendations 138 (e.g., provide the code recommendations 138 to the user).

Thus, for each job request (e.g., request to perform an inference to generate recommendations on source code from a repository), inference service 126 generates one or more recommendation 138 for the source code from the repository.

In some embodiments, the code reviewer service 112 (and other services shown in FIG. 1) is implemented as a service within a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 108 (e.g., the internal via one or more interface(s) 110, such as through use of application programming interface (API) calls, via a console implemented as a website or application, etc. The interface(s) 110 may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service (e.g., on demand functions 124 in FIG. 1) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As an example high-level overview, each (e.g., inference) request to perform a review of source code triggers a separate compute instance (e.g., managed by compute instance configuration service 128) that runs code recommendation service 130 on the customer source code and generates recommendations 138. In one embodiment, if the inference is for pull requests, then these recommendations are posted on the pull request as comments. In one embodiment (e.g., when the inference is for an entire code repository), the recommendations 138 are stored (e.g., encrypted) in code reviewer service 112 (e.g., in metadata service 116) and provided to the customer via a list recommendations API. In one embodiment, a compute instance (e.g., container) is torn down after running inference (e.g., which deletes all the pulled customer code).

In one embodiment, inference service 126 fetches the source code artifacts, validates, and extracts features, e.g., by parsing the source code into a control flow and data flow graph. In one embodiment, the control flow and data flow graph represent the dependencies between program elements from the source code, e.g., the graph is rich in context about the various relationships including type usages, and both data and control flows between program elements that permit the design and development of complex and semantic rules. In one embodiment, the inference service 126 generates recommendations 138 by running a combination of various machine learning model(s) 132 and/or rule(s) 134 with code recommendation service 130, e.g., code recommendation service 130 executed within a sandboxed environment of a compute instance (e.g., a container).

In some embodiments, rules can be authored using a query language that breaks into several concrete objectives such as the ability to define, and encapsulate, semantic behaviors of interest in code (for example, whether the return value of a method call is checked downstream). Rules can be modeled as queries, where users can draw on their familiarity with popular languages like SQL. Rules are objects that are readable, maintainable, and amenable to optimization at the level of the evaluation engine (rather than on a per-rule basis). Rules are objects that can be ported, with minimal effort, to other programming languages.

In certain embodiments, code recommendation service 130 supports running various types of rules and/or detectors, e.g., from simple regular expression (regex) based to complex program/semantic analysis-based rules. Additionally, or alternatively, code recommendation service 130 supports running one or more machine learning models (e.g., a model trained a detector to predict issue(s) with source code). In certain embodiments, the code recommendation service 130 provides various abstractions to write the rules that work at method, file, or the entire project context to design and implement such various types of rules. In certain embodiments, the code recommendation service 130 provides an interface so that user-defined rules 136 can be written to work directly on the source code (e.g., in text form or on extracted features from the source code).

In one embodiment, code reviewer service 112 includes a metrics monitoring service 140 to capture various metrics of the code reviewer service 112, e.g., metrics on the running of different rules, ways to whitelist or run certain rules in shadow, and/or allow versioning of the rules (e.g., version 1, version 2, etc. as rules are modified).

In certain embodiments, for each recommendation (e.g., both for pull-requests and repository inference), provider network 100 (e.g., code recommendation service 130) stores certain metadata based on the source code without storing the actual source code from customer code repository. In one embodiment, this metadata allows a user/code reviewer service to gather metrics and will act as a feedback loop for a model(s), e.g., as customers provide their feedback on these recommendations. Non-limiting examples of this metadata are a recommendation identification (ID), code repository metadata (e.g., provider, repository-name etc.), and/or source of recommendation (e.g., identification of the rule(s) and/or model(s) used for the inference).

Next, an example usage of code reviewer service 112 is described with reference to encircled numbers "1" through "15" of FIG. 1. In certain embodiments, code reviewer service 112 (e.g., frontend service 114) receives a request to perform a review of source code at the circle "1", for example, with the request identifying the particular source code and/or code repository 144 storing the source code and including a user-defined rule. The request may be from user 102A utilizing a computing device 104 (for example, client 106 implemented by a computing device 104 outside the provider network 100, e.g., as part of an application installed on a personal computer or server computing device or as part of a web-based console provided by the provider network 100) to send one or more messages (e.g., API call(s)) to the provider network 100 to request the review of source code. The frontend service 114 in an embodiment of this example sends a message at circle "2" to cause metadata service 116 to create an inference workflow for that source code. The job orchestrator 118 in an embodiment of this example sends a message at circle "3" is to poll (e.g., sweep) the metadata service 116 for pending onboarding and inference tasks. If a pending task is an onboarding task, metadata service 116 in an embodiment of this example sends a message at circle "4" to cause onboarding service 152 to configure (at circle "6") the onboarding of the source code (e.g., via event router service(s) 146 as discussed herein). In one embodiment of this example, onboarding service 152 is to send a message at circle "5" to indicate to metadata service 116 that the onboarding is complete. In one embodiment, after the source code has been onboarded (e.g., including monitoring of the source code (e.g., repository 144) for an event to trigger a code review), a triggering event (e.g., a pull request or a user's explicit request) causes a corresponding message to be sent to event router services 146. In certain embodiments, a triggering event is a user 102B causing at circle "7A" a change detected by source (e.g., version) control service 142. In certain embodiments, a triggering event is a user causing at circle "7B" a change detected by webhook service 150. In one embodiment of this example, event handler 120 receives in event queue(s) 122 a message from event router services 146 for a monitored event and on-demand function 124 detects this message at circle "8". The event handler 120 (e.g., on-demand function 124 set-up to perform this action) in an embodiment of this example sends a message at circle "9" to cause metadata service 116 to create a job for this inference request (e.g., the code is to be reviewed now). The inference service 126 in an embodiment of this example detects the job and begins the inference request. As discussed above, the job orchestrator 118 in an embodiment of this example sends a message at circle "3" is to poll (e.g., sweep) the metadata service 116 for pending onboarding and inference tasks. In one embodiment of this example, on detection of an inference task (e.g., job), job orchestrator 118 sends a message at circle "10" to inference service 126 (e.g., to workflow service 200 discussed in reference to FIG. 2) to trigger an inference workflow. In certain embodiments, the inference service 126 performs one or more internal API calls to metadata service 116 at circle "11" to cause the inference job to be performed. The inference service 126 in an embodiment of this example sends (or causing the sending of) a message at circle "12" to access the source code that is to be reviewed. After the inference service 126 (e.g., code recommendation service 130) performs its review, it generates one or more recommendations 138 for the source code at circle "13" in certain embodiments. In one embodiment, the recommendation(s) 138 are sent to the code repository 144 at circle "14", e.g., for posting on a pull request. In one embodiment, a user performs an API call via frontend service 114 to access the recommendation(s) 138. In one embodiment, recommendation(s) 138 (e.g., results) may include an indication of "no recommendations" (e.g., because no predicted issues were identified) and/or a "success" or "failure" indication (e.g., indicating success and failure, respectively, of the inference job) for rules 134. In some embodiments, for custom-rules 136 the result includes an indication of one or more of: whether rule evaluation was successful; whether evaluation of one or more preconditions was successful; a last match result; a last non-empty match result (which is useful if rule evaluation failed, and so the last match result is empty); and/or a last operation evaluated (which is useful if rule evaluation failed to localize the failure point). Note that a "pull request" may include a custom rule.

Metrics may be monitored (e.g., collected) by metric monitoring service 140 at circle "15".

Code reviewer service 112 may also train one or more machine learning models 132 for use by code recommendation service in generating predicted issues and/or recommendations based on those predicted issues in some embodiments.

In certain embodiments, a pull request is the primary way for repository users to review, comment on, and merge code changes from one branch to another. For example, a user can pull requests to collaboratively review code changes for minor changes or fixes, major feature additions, or new versions of released software. The following paragraph describes one possible workflow for a pull request.

A developer working in a repository named Repo, wants to work on a new feature for an upcoming version of a product. To keep their work separate from production-ready code, the developer creates a branch off of the default branch and names it Feature. The developer writes code, makes commits, and pushes the new Feature code into this branch. If the developer wants other repository users to review the code for quality before the developer merges the changes into the default branch. To do this, the developer creates a pull request, e.g., with all of this occurring separately from code reviewer service 112 in FIG. 1. In one embodiment, the pull request contains the comparison between the working branch and the branch of the code where the developer intends to merge their changes (in this case, the default branch). The developer can also create an approval rule that requires a specified number of users to approve the pull request. The developer can specify an approval pool of users. Thus, other users can review the developer's code and changes, adding comments and suggestions. The developer might update their working branch multiple times with code changes in response to comments. The changes are incorporated into the pull request every time the developer pushes them to that branch, e.g., using source (e.g., version) control service 142. The developer may incorporate changes that have been made in the intended destination branch while the pull request is open, so users can be sure they are reviewing all of the proposed changes in context. When the developer and the reviewers are satisfied, and the conditions for approval rules (e.g., if any) have been satisfied, the developer (or one of the reviewers) merges the code and closes the pull request.

In certain embodiments, rule editor service 180 provides the ability to edit rules (e.g., rules 134) using a visual query language (VQL). The rule editor service 180 translates rules from a text format (e.g., text-based formats such as a query language, ASCII or other encoding, etc.) to a graph-based format that can be displayed in a graphical user interface (GUI) in a client application such as a web browser (e.g., client 106). Users' changes to the graph-based format are converted back into corresponding changes to the text format.

In certain embodiments, the graph-based format is referred to as a program dependence graph (PDG). A PDG is a labeled graph that captures data and control dependencies in a program. Nodes in the PDG are classified as data nodes and action nodes. Data nodes are, optionally, labeled with the data types and values for literals, and action nodes are labeled with the operations they correspond to, for e.g., method name for method call nodes, etc. Edges in the PDG correspond to data-flow and control dependencies and are labeled as recv (connects receiver object to a method call node), parai (connects the ith parameter to the operation), def (connects an action node to the data value it defines), dep (connects an action node to all nodes that are directly control dependent on it) and throw (connects a method call node to a catch node indicating exceptional control flow).

In certain embodiments, transformations can be applied to PDGs to obtain a normalized code representation that is more conducive to rule synthesis. One exemplary transformation is abstracting the label of relational operations such as $\leq$, $\geq$, $==$, etc. to a common label rel_op. Another exemplary transformation is using heuristics to identify calls to a getter method. If a PDG has multiple calls to the same getter method with the same arguments and receiver object, it is transformed into a PDG that has a single getter call and the value returned by the getter is directly used at other call sites in the original PDG. Such a transformations can be applied iteratively until convergence. Another exemplary transformation is for commutative operations such as the phi node or +operator, the incoming parameter edges are not labeled with the parameter index.

Figure 2:
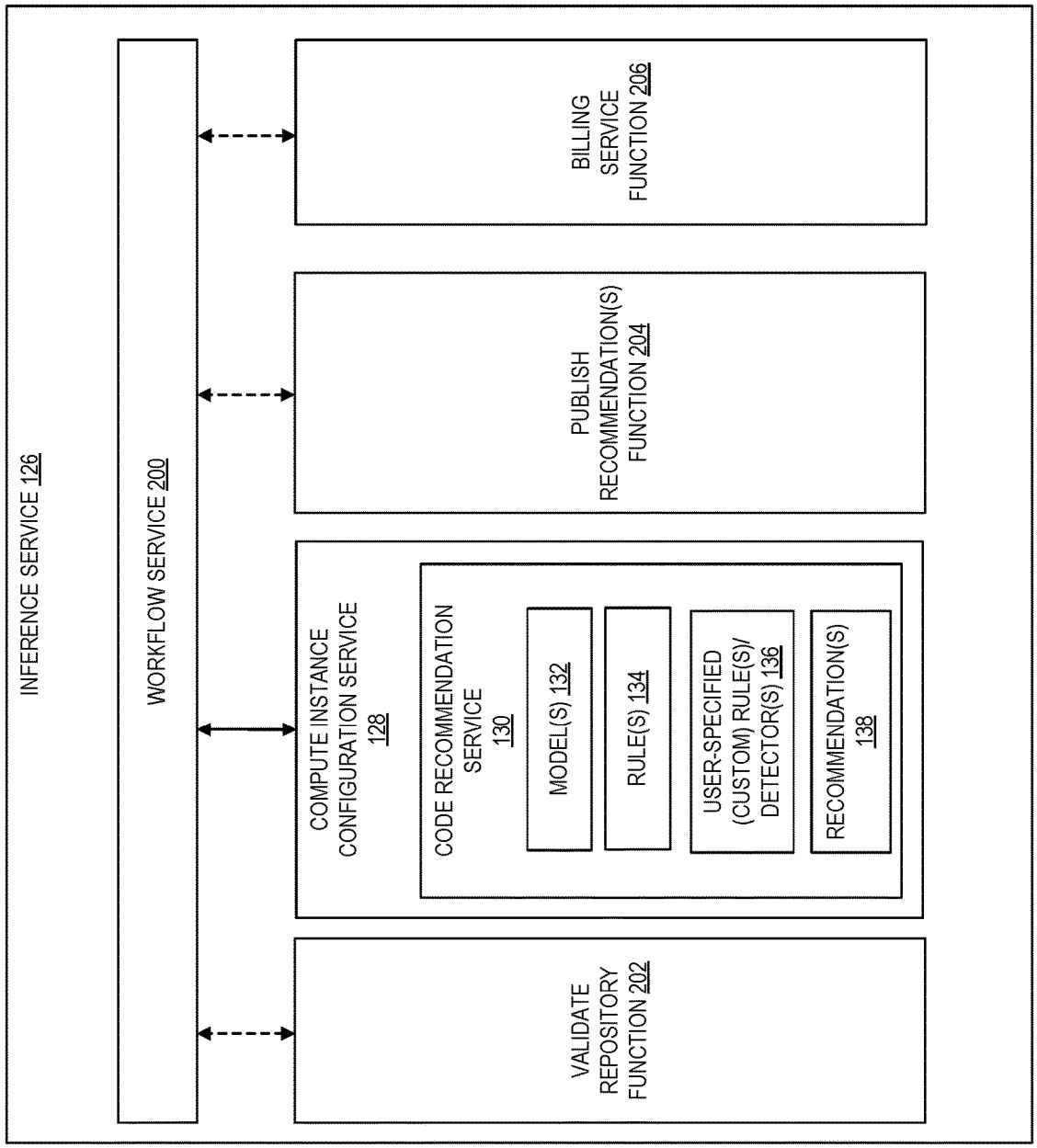
FIG. 2 is a diagram illustrating an inference service according to some embodiments.

FIG. 2 is a diagram illustrating an inference service 126 according to some embodiments. Inference service 126 may run one or more rules 134 and/or one or more machine learning models 132 to produce recommendations on a customer's source code. In certain embodiments, (e.g., multi-tenant) inference service 126 interacts with other components of code reviewer service 112, including, but not limited to, event handler(s) 120, metadata service 116, and job orchestrator 118 to fetch an inference job and run it securely and at scale in a sand-boxed environment (e.g., as managed by compute instance configuration service 128). In certain embodiments, inference service 126 provides recommendations 138 for specific source code (e.g., less than the entire repository) that helps to improve the code quality of specific source code, recommendations 138 for a given repository 144 that helps to improve the code quality of the entire repository, is multi-tenant and handles customer's code repositories securely, is capable of running rules 134 (and/or user-defined rules 136) and integrating with machine learning models to provide recommendations on multiple categories (e.g., concurrency, best practices, etc.), is scalable to (e.g., concurrently) run multiple jobs (e.g., either for an entire repository or for a proper subset of files within a repository) asynchronously (e.g., within a certain time threshold for completion), or any combination(s) thereof.

As two non-limiting examples, a customer can get code recommendations from code recommendation service 130 on a repository (1) as a Pull Request inference where a customer onboards a given repository so that the code recommendation service 130 posts recommendations 138 on every pull request on that repository and/or (2) as an On-Demand inference where a customer uses a create recommendation job API to trigger inference on the entire code repository. In one embodiment, this API call results in an asynchronous job with a job ID that fetches the repository and runs inference on it. In one embodiment, once the job finishes, the customer can view code recommendations generated by the job in a console or by calling a list recommendations API that includes the job ID. In one embodiment, a customer can use On-Demand inference before (and after) onboarding the code repository as a source for code recommendation service 130. In certain embodiments, recommendations for both types of inferences (1) and (2) are generated via the same inference system asynchronously.

Inference service 126 in FIG. 2 includes a validate repository function 202 to validate that the repository is the correct repository for the inference request. Inference service 126 in FIG. 2 includes a publish recommendation(s) function 204 that publishes the recommendation(s) 138 for a user, e.g., publishes them back to the repository (e.g., on a pull request of the repository). Inference service 126 in FIG. 2 includes a billing service function 206 that tracks the resource utilization for an (e.g., each) inference request, e.g., and causes an invoice to be sent based on that utilization.

Figure 3:
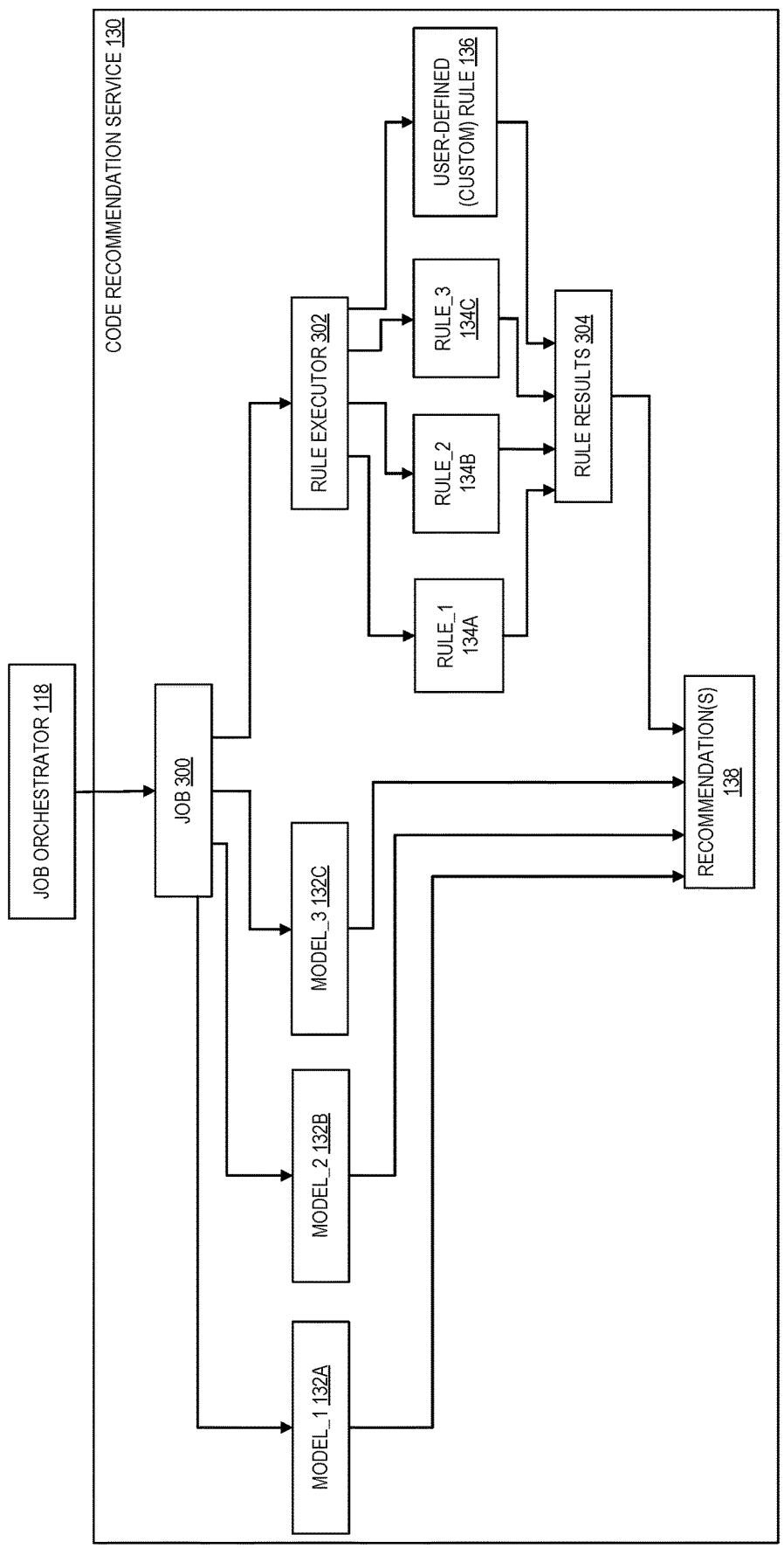
FIG. 3 is a diagram illustrating a code recommendation service according to some embodiments.

FIG. 3 is a diagram illustrating a code recommendation service 130 according to some embodiments. This section will provide details about types of rules. Rules can be categorized in multiple ways. One way is to categorize rules by the different data types that may be utilized. For example, (1) Source code based rules (e.g., that use source code as a input), (2) control flow and data flow graph based rules (e.g., using a graph derived from source code) (e.g., a MUgraph), and (3) Abstract syntax tree (AST) based rules (e.g., using AST extraction from source code).

Different rules can require different context to evaluate code and make suggestions: (1) rules that only need changed file as context (e.g., that use changed files only), (2) rules that need all source code files in current package source folder as context, (3) rules that use all files of defined type in current package as context, (4) rules that use an entire package as context including test folder, or (5) rules that use all downstream dependencies as context.

Certain embodiments herein take both data types and context into consideration, and weigh in current implementation to categorize rules. (1) Regular expression (regex) based rules that (e.g., only) use changed file as context. This rule may apply a list of specified regex expressions to source code and return corresponding comment and line number if there is any matching. In certain embodiments, it does not require any feature extraction or any additional context, and can be applied to changed file source code directly. (2) Graph based rules that use pre-processing to extract the graph from source code and (i) with changed files as context, (ii) with all source files from current package as context, or (iii) with all files from current package as context. (3) Domain-specific Language (DSL) based rules that have following statements: rule setup, precondition, postcondition, and/or actual check. Rules fitting here is to have a defined sequence of actions. It can be a combination of function calls as a sequence of statements. It can also be nested functions or chained methods. Rules will be applied to source code file: (i) with changed files as context, (ii) with all source files from current package as context, or (iii) with all files from current package as context. (4) Other data type based rules that use a preprocessing of feature extraction. Depending on the model type used, preprocessing may then perform feature extraction on source code and pass required model to execution step. Same data type can share the same feature extraction process. Data types can be AST or other.

Code recommendation service 130 includes a rule executor 302 that allows for (i) rule orders (e.g., that supports labeling the executing order of rules). A rule can be a condition for other rules. For example, rule1 and rule2 can all wait for rule3 to finish before starting. A conditional rule can be defined using this priority and determine rule execution. Code recommendation service can build on top of this to make more complicated sequences if needed. (ii) Composite rules that allows for the creation of composite rules from primitive ones (e.g., grouping multiple rules). A composite rule can be created as a parent rule that have multiple children rules. If all conditions are satisfied or from different rules, a different action can be executed. Rules can be grouped in the same category to emit metric together, or used to divide rules running in different threads, or use to apply complicated regex, or graph using different conditions. (iii) Activation Rule Group supports grouping multiple rules and only uses (e.g., fires) the first rule that meets the condition. This can be used for a set of rules, when all their conditions are satisfied, yet a user only wants to generate a comment from one of the rules. (iv) Custom Rule Engine offers the flexibility to run customize rule engine. (v) Rule Engine Parameters allows for rules to be handled in different ways. For example, it can skip following rules when a rule is applied, it can skip following when there is a rule that fails, it can skip following rules if a rule is not triggered, and/or it can skip following rule when priority exceeds certain threshold. In some embodiments, the rule executor 302 is an interpreter of the queries of a rule into actions to be performed.

The below discusses a rule interface design. The term "facts" may refer to a set of known inputs at the time of firing rules, e.g., holding a HashMap<String, Object>. Each fact may have a unique name. Any object can act as a fact.

(1) If the input that inference is to be performed on is source code, can (a) pass as a list of file paths or (b) iterate file path list and read source code to memory that inference is to be performed on.

(2) Some rules may use extracted features that are derived from source code. When a new rule category gets introduced with new extracted feature model type, it may define a new fact type.

Feature extracting may be performed (a) prior to firing any rule (e.g., when initializing facts and reading in source code files, extract all type of features needed for upcoming rules or (b) make feature extraction a prerequisite rule of rules that requires derived features.

(3) Rule result(s) may be stored for each recommendation that a rule generates. In one embodiment, the rule result has a list of rule findings that contains following variables: file path, startLine, endLine, comment, rule name, confidence score, priority (when there are too many findings on same file, use priority to filter finding before surfacing to customer), or any combination(s) thereof.

In FIG. 3, job 300 may include an indication of various models (132A-132C) and rules (134A-134C and/or 136). The number of rules and models shown is merely an example, and any single rule, plurality of rules, single model, or plurality of models may be used. Rule results 304 may thus include a result from one rule or more than one rule. In certain embodiments, code recommendation service uses the outputs from the model(s) and/or rule(s) to generate recommendations 138.

Referring again to FIG. 3, certain rules are executed by rule executor 302 with the flow including: (1) registering with the code recommendation service 130 the rule(s) to be executed for a particular job 300, (2) creating the inputs (e.g., "facts) such that (i) fact builder reads the input file path and loads source code, (ii) the fact builder optionally perform feature extraction and store it (e.g., to facts map), and (iii) initializing a field to store rule detection result (e.g., rule results 304), (3) applying (e.g., firing) rules (e.g., including a user-defined configurations of running rules) and in one embodiment, if multiple rules are fired and one rule fails due to unexpected exception, it will not affect other rules that are running in parallel, e.g., it will only affect the rules that have a chain dependency on this failed rule, such as prerequisite rule or composite rule, (4) collect results, and (5) filtering results (e.g., to eliminate duplicate findings (too many same suggestions for same file), similar findings (different rules generating similar recommendations), overlapping findings (too many suggestions on the same line), etc. The filter(s) can be based on rule finding priority, confidence score, and/or a customized value each rule defines.

Metrics (e.g., generated) by metric monitoring service 140 may include any one or combination of: (1) availability metrics (e.g., bad request count (Error), modeled exceptions count (Fault), and/or runtime or not modeled exceptions count (Failure)), (2) rule specific metrics (e.g., number of findings per rule per request, number of findings for all rules per request, number of requests that have zero findings of individual rule, number of requests that have zero findings of all rules, number of rules fired successfully per request, and/or number of rules fired failed per request), (3) traffic metrics (e.g., total file size for each request and/or if a rule has an execution condition, the number of requests that pass the execution condition check and are executed), (4) duration metrics (e.g., duration to execute each rule and get findings per request, duration to read in files per request, and/or duration to extract features per request) and/or (5) alarms (e.g., spike in bad request count and/or runtime exception failure count exceeding a threshold value for a time period).

Views on coding best practices, as well as what it means to enforce code hygiene and quality, may vary vastly across teams and organizations. The ability to extend and customize inference service 126 can help customers adapt it to suit better their needs.

Rules workbench enables users to define custom rules (e.g., and detectors). In certain embodiments, users can use one of three modes to define rules: (1) use the guided workflow to come up with a rule definition and validate against sample code, (2) start with sample code and ask code reviewer service to recommend rule(s), refine these rules, and validate against sample code, and (3) implement a supported interface for a user to build a custom implementation of a rule and host it on compute environment of their choice. In certain embodiments, the inference service 126 supports the ability for customers to share an endpoint to a custom detector (e.g., hosted by the customer) so that they can be run as part of a base set of rules and/or models.

In certain embodiments, a detector is implemented as machine learning model(s) or rule(s). In certain embodiments, the inference service 126 supports running detectors at method, file, or the entire project context allowing for the design and implementation of various types of rules/detectors. In certain embodiments, the inference service 126 supports various interfaces so that rules can be written to work directly on the source code in text form or on extracted features. For each inference job, in certain embodiments the inference service 126 may run (e.g., in addition to non-user defined rules of the inference service 126) user defined rules and/or (e.g., user-hosted) detectors to provide recommendations on code. In one embodiment, the inference service 126 reports metrics (e.g., to metrics monitoring service 140) for all rules/detectors it runs that can be used by users to customize and adapt their rules/the code recommendation service 130.

The custom rules 136 detailed herein are typically applied at the method level, where the method-level graph representation captures control and data flow. However, inter-procedural matching is also supported. The custom rules support analysis beginning at any node in a graph. The analysis may be forward data flow analysis, a backward data flow analysis, a combination of forward and backward, across methods, and/or may incorporate custom functionality (e.g., functionality not provided by the operations detailed herein).

A custom rule represents a sequence of operations. In some embodiments, a rule consists of a plurality of sections. For example, a rule may consist of one or more of: a prefix, precondition, and postcondition. The prefix specifies the name of the rule and may also include a message to be shown for when a rule evaluation fails. In addition, the prefix can optionally include a filter constraining the methods to which the rule is applied. The precondition specifies the rule's applicability to a given method. The postcondition expresses a check to be performed. Its evaluation is contingent on the precondition being satisfied.

An operation executes a step in the query, and thus transforms the input match result into an output match result. A match result is the set of graph nodes matching the current step in a query (or rule). In the initial state, before query evaluation begins, the match result contains all graph nodes.

The evaluation of a rule yields a result consisting of one or more aspects. In some embodiments, the result includes an indication of one or more of: whether rule evaluation was successful; whether evaluation of one or more preconditions was successful; a last match result; a last non-empty match result (which is useful if rule evaluation failed, and so the last match result is empty); and/or a last operation evaluated (which is useful if rule evaluation failed to localize the failure point).

As an example, consider a simple example of a library L with two APIs (run and checkResult) where the practice to enforce is that a call to run is followed by a call to checkResult on its return value. That would translate into the following rule structure:

Precondition: Check whether there is a call to run.
Postcondition: Collect the return values of all run calls into a match result M.
  For all data nodes in M, check that they flow into a checkResult call.

The semantics of rule evaluation follows the logical rule of inference such that when a precondition section yields an empty match result M (that is in this example, no run calls are found), then rule evaluation (vacuously) succeeds.

If the precondition yields a non-empty match result M (which, assuming universal quantification, means that all calls flow into calls), then rule evaluation succeeds if and only if the postcondition yields a non-empty match result.

Note that when transitioning from precondition to postcondition, the match result is reset. That is, the starting point for both precondition and postcondition is all graph nodes.

Examples of categories of operations include, but are not limited, to one or more of: core operations, filter operations, transformer operations, and higher-order operations.

Core operations may include, but are not limited to: 1) a check operation, which separates a rule's precondition from its postcondition, and in the process, resets the match result; 2) "as" and "with-id" operations which perform storing and loading of intermediate match results, respectively; 3) an instrumentation operation which enables interleaving a function into the rule, at any point, to record information of interest regarding the match result (not the function is expected not to alter the match result); and/or 4) a thresholding operation that allows for limiting of the number of elements in the match result.

A filter operation is parameterized by (i) a predicate p (ii) a quantifier (ALL or ANY). It iterates through the input match result M. In the case of ALL, it returns M if all elements of M model p, or else it returns the empty match result. In the case of ANY, it returns the elements of M that model p.

Unlike a filter, which returns a subset of the input match result, a transformer operation returns a match result that potentially contains new elements. As an example, the then transformer operation returns all the nodes in the graph that occur after nodes in the match result per the graph's control flow edges.

A higher-order operation is an operation that nests within it one or more subrules. As an example, the query language allows the expression of (unbounded) disjunction via the one-of operation. In this case, each branch is modeled as a subrule.

Beyond the operations themselves, which comprise matching matches that target the method's body, the query language may also expose filters on the methods themselves. For example, the user may wish to skip checking of all methods that are not Coral operations. Matching at the method level is done via method matchers, which can be specified as part of the rule's prefix (that is, before the operations).

Custom rules allow for an interleave between a backward analysis and forward analysis based on user-specified conditions (start and stop nodes for example), an analysis between sub-graphs by a query from a first sub-graph to a second-sub-graph of a graph, the storage from an analysis on a sub-graph that is used in the analysis of a different sub-graph, in conjunction with analysis of a different subgraph, etc.

FIG. 4 illustrates an exemplary way of defining code review rules in logic according to some embodiments. In the illustrated formulation, a rule is quantified first-order logic formulas over PDGs. A rule is a formula of the form $\exists \vec{x}$, pre($\vec{x}$)^¬(∀$\exists \vec{y}$, post($\vec{x}, \vec{y}$)), where $\vec{x}$ and $\vec{y}$ are a set of quantified variables that range over distinct nodes in a PDG. The precondition pre($\vec{x}$) evaluates to True on buggy code and the postcondition post($\vec{x}, \vec{y}$) evaluates to True on correct code, with appropriate instantiations for $\vec{x}$ and $\vec{y}$. Because of the negation before the postcondition, the entire formula evaluates to True on buggy code and False on correct code. Intuitively, the precondition captures code elements of interest in buggy, and possibly correct, code, and the postcondition captures the same in correct code. The code elements of interest appear as existentially quantified variables. Such a format that can express a wide range of code quality issues.

Formulas pre($\vec{x}$) and post($\vec{x}, \vec{y}$) are quantifier-free subrules comprising a conjunction of atomic node predicates η($\vec{x}$) and atomic edge predicates ε($\vec{x}$) that correspond to edges $$x_1 \xrightarrow{e} x_2$$

in the PDG. Node predicates η($\vec{x}$) express various node properties including the node label, data-type, data values for literals, number of parameters for method calls, declaring class type for static method calls, the set of nodes on which x is transitively control dependent and whether a method call's output is/is not ignored.

Rules with a disjunction in the precondition can be expressed as separate rules in this syntax. A rule with a precondition comprising a negated code pattern (e.g., $$\neg x_1 \xrightarrow{e} x_2$$

) can be expressed using a positive pattern in the rule postcondition, and vice-versa. This exemplary choice of rule syntax is influenced by Guru Query Language (GQL). An exemplary GQL rule typically consists of precondition and postcondition graph patterns and uses node and edge predicates as a fundamental abstraction for expressing such a rule.

Checking if a rule satisfies a code example represented as a PDG can be reduced to satisfiability modulo theories (SMT). Since PDGs are finite graphs, this satisfiability check is decidable. By mapping nodes in the PDG to bounded integers, this check can be reduced to satisfiability in the Presburger arithmetic. State-of-the-art SMT solvers such as Z3 can discharge these checks efficiently.

Figure 6:
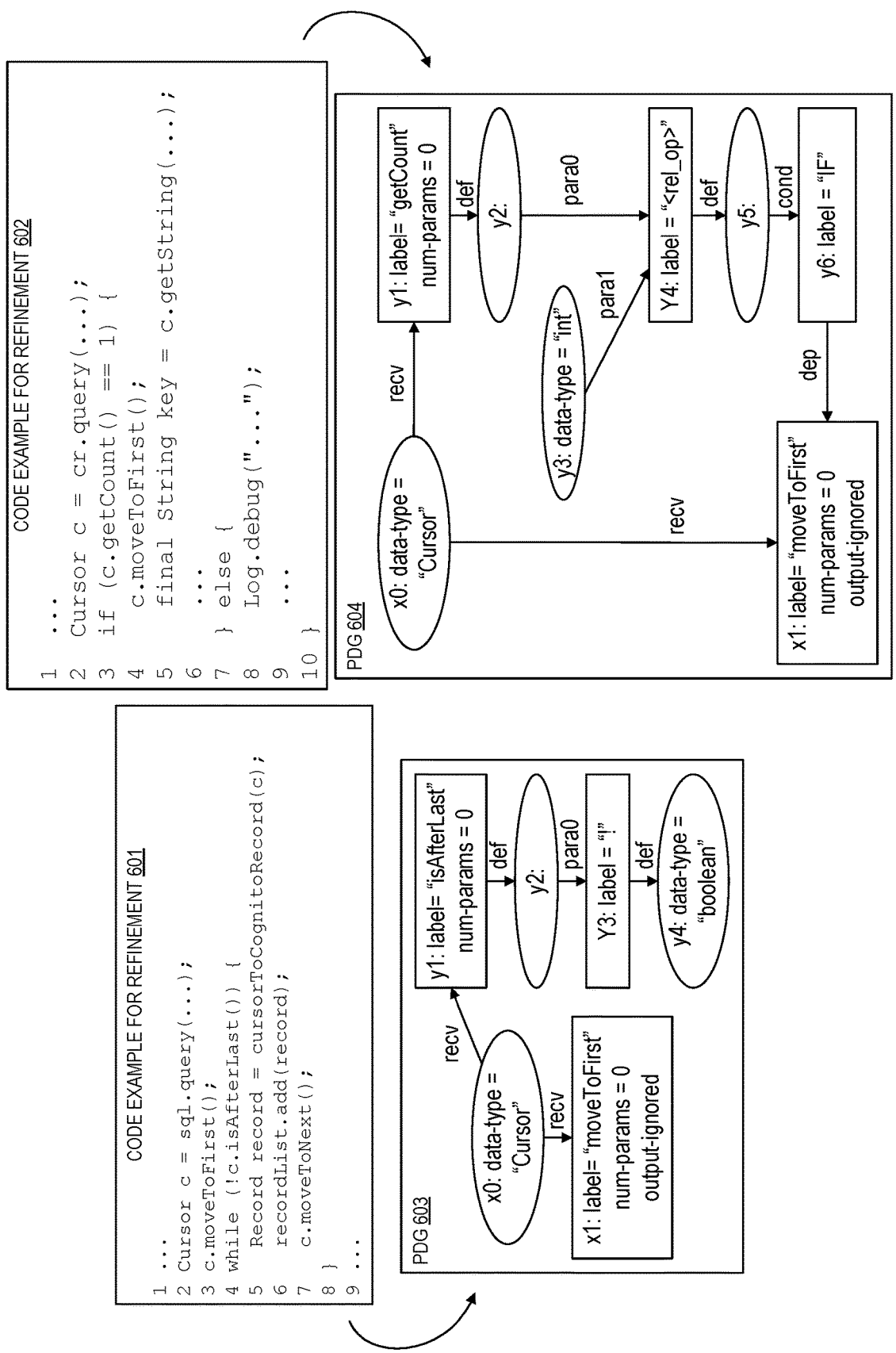

FIGS. 5-7 illustrates an exemplary synthesis of a code review rule according to some embodiments. In FIG. 5, code examples with changes 501, 502 illustrate two code snippets that make calls to a cursor's moveToFirst method. In the "before" of both examples, a "buggy" version includes a method call that does not handle the case when the cursor accessing the result set of a database query is empty (example 501 line 3, example 502 line 2). Left unchecked, an application including such a call might crash when subsequent operations are called on the cursor. In the "after" of both examples, a developer has added a check by handling the case when the method call returns False (example 501 lines 4-7, example 502 lines 3-5).

A precondition for the rule is synthesized using buggy code examples 501, 502 (before the change). An alignment of the PDG representations of examples 501, 502 is performed to find the correspondence between nodes in the different examples. The graph alignment can be framed as an Integer Linear Program (ILP) optimization problem that minimizes the graph edit distance or, in other words, maximizes the alignment. In the example, graph alignment determines that the data variables cursor in example 501 and mProviderCursor in example 502 correspond to each other. Similarly, the calls moveToFirst correspond. On the other hand, the call getString in the first example does not have any corresponding node in the second example. This node correspondence map can be used to construct a PDG representation that encapsulates information from all buggy examples. PDG 503 illustrates this PDG. The solid lines in the PDG 503 indicate that the corresponding nodes and edges are present in all buggy examples.

PDG 503 is reduced to the common features to synthesize PDG 504. PDG 504 corresponds to the precondition formula $\exists x_0, x_1, pre(x_0, x_1)$ where $pre(x_0, x_1)$ is described in FIG. 7. Besides other checks, the precondition asserts that the output of moveToFirst call is ignored, i.e., it is not defined or not used.

To synthesize postcondition(s) for the rule, non-buggy examples that satisfy the precondition are identified. If there are such examples, the postcondition is synthesized from them and strengthen the precondition with ¬ post so that the overall rule rejects the non-buggy examples. In this case, there are no code-after examples 501, 502 in the input that satisfy the precondition, since the value returned by moveToFirst is used in all of these examples. Consequently, a vacuous postcondition=False can be used and the rule is the same as the precondition we synthesized above.

Figure 8:
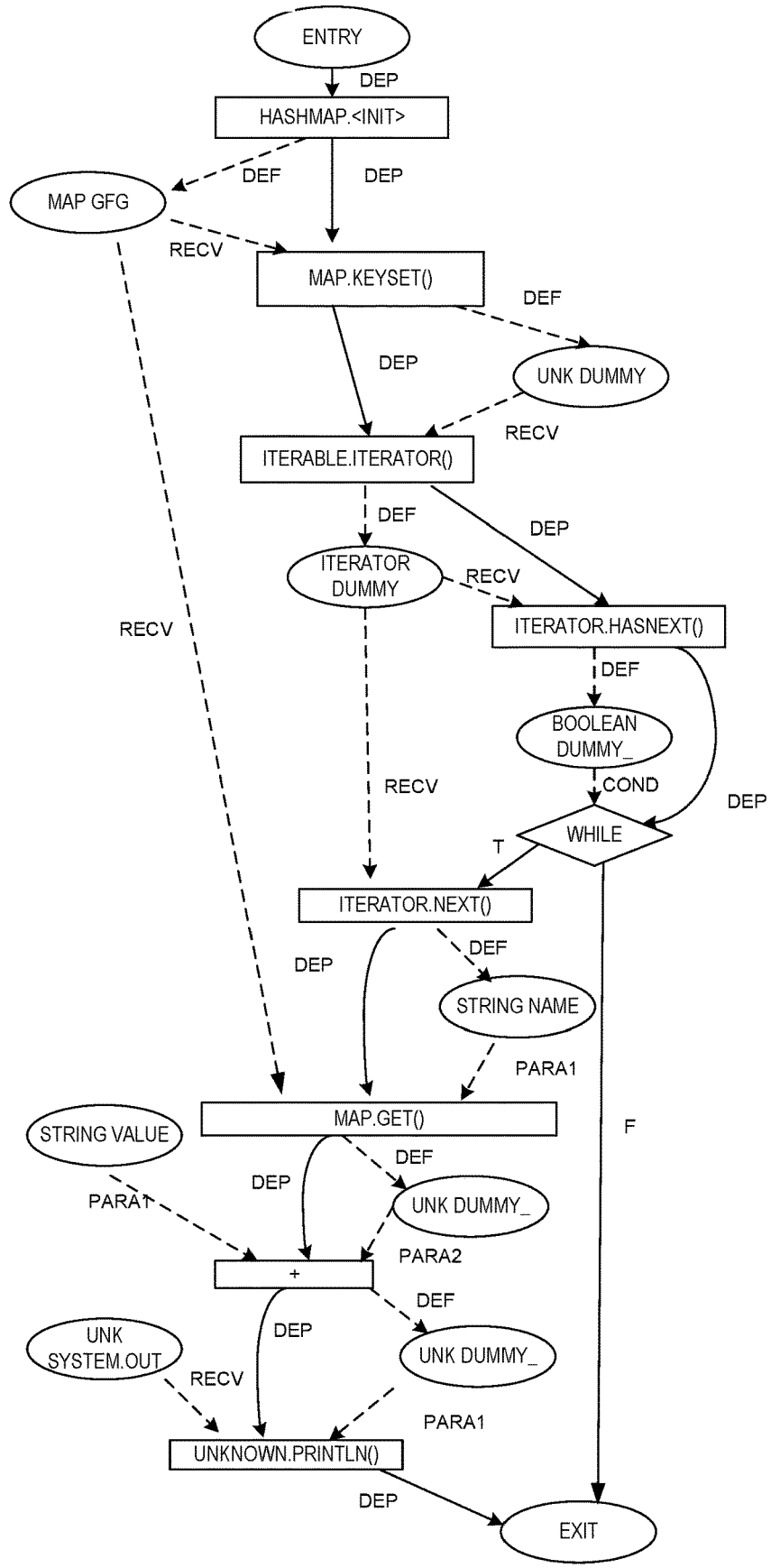
FIG. 8 illustrates an exemplary graph according to some embodiments.

As discussed herein, the sequence of operations in PDG 504 can be specified in a rule text format (see FIG. 8 and the associated discussion for an example). At this stage, the code recommendation service 130 can use the rule corresponding to the PDG 504 to search for matching sequences of operations in a user's source code. For example, a user can submit a request to analyze code. The code recommendations service 130 can review the code using the rule and, if any matches are found, the code recommendation service 130 can provide an indication of the location of the match(es) (e.g., via source code file name and line number). Note that in some embodiments, the rule may be compiled prior to use in a code review analysis (e.g., if the rule is compiled as an object using a language such as Java, C++, etc.).

In some embodiments, a rule can be further refined, for example, when the initial set of examples does not capture all code variations. FIG. 6 illustrates code examples 601, 602 of non-buggy code. Code examples 601, 602 may have been identified by running a rule based on the precondition synthesized as discussed with reference to FIG. 5 with the code recommendation service 130.

Based on examples 601, 602, the following checks also check the emptiness of the result set and would constitute non-buggy code: (1) cursor.getCount( )==0 and (2) cursor.isAfterLast( ) returns True. These variations were not part of the initial corpus of code examples 501, 502.

PDG 603 represents code example 601, and PDG 604 represents code example 602. The rule postcondition can be re-synthesized using the PDGs 603, 604 similar to the synthesis of the precondition described above. In some cases, the synthesized postcondition may be too general and permit even the buggy examples, so it can be used as a forcing function to partition the non-buggy examples using a top-down entropy-based algorithm and synthesize a conjunctive postcondition for each partition.

FIG. 7 illustrates a logical form of the exemplary rule to check the moveToFirst method call of a cursor as described with reference to FIGS. 5 and 6. Informally, the synthesized rule R satisfies all code examples that call Cursor.moveToFirst such that they do not check the value returned by this call, nor call Cursor.isAfterLast or Cursor.getCount.

FIG. 8 illustrates an exemplary graph according to some embodiments. Oval nodes indicate data nodes and rectangular nodes indicate action nodes. The following description illustrates the relation between a graph such as a PDG and a corresponding text-based rule, specifically between the graph illustrated in FIG. 8 and the following GQL-based rule:

| 1 | new CustomRule.Builder( ) |
| 2 | .withName(RULE_NAME) |
| 3 | .withComment(Comment) |
| 4 | .withMethodCall("keySet") |
| 5 | .withReceiverByType("Map") |
| 6 | .as("keySetCall") |
| 7 | .withReceiverTransform( ) |
| 8 | .as("receiver") |
| 9 | .then( ) |
| 10 | .withMethodCall("get") |

-continued

| 11 | .withContext(ContextKind.LOOP) |
| 12 | .withReceiverID("receiver") |
| 13 | .as("getCallOnMapInLoop") |
| 14 | .check( ) |
| 15 | .withID "getCallOnMapInLoop") |
| 16 | .withoutIntraproceduralDataFromID("keySetCall") |
| 17 | .build( ) ; |

The rule starts with a standard prefix that specifies the rule's name and comment (lines 1-3). A filter predicate is introduced in line 3 which is to cause a search for "keySet" calls whose receiver has type "Map" (lines 4-5). The .as operation of line 6 causes a store of the current match results (matching graph nodes) ([Map.keySet( )]) under the id of "keySetCall". A transform from the call nodes to their respective receiver nodes is made at line 7. The .as operation of line 8 is to cause a store of the matching graph nodes (("Map gfg")) under the id "receiver". A transform from the matching graph nodes to the downstream nodes in the graph is made at line 9. A search for "get" calls in a loop with receivers in common with the "keySet" calls occurs in lines 10-12. The matching graph nodes ([Map.get( )]) are stored under id "getCallOnMapInLoop" in line 13. A switch to a check is made at line 14. The graph nodes corresponding to the matching "get" calls are loaded in line 15. Finally, a check to ensure that there is no local data flow from the "keySet" calls to the "get" calls is made at line 16.

Figure 9:
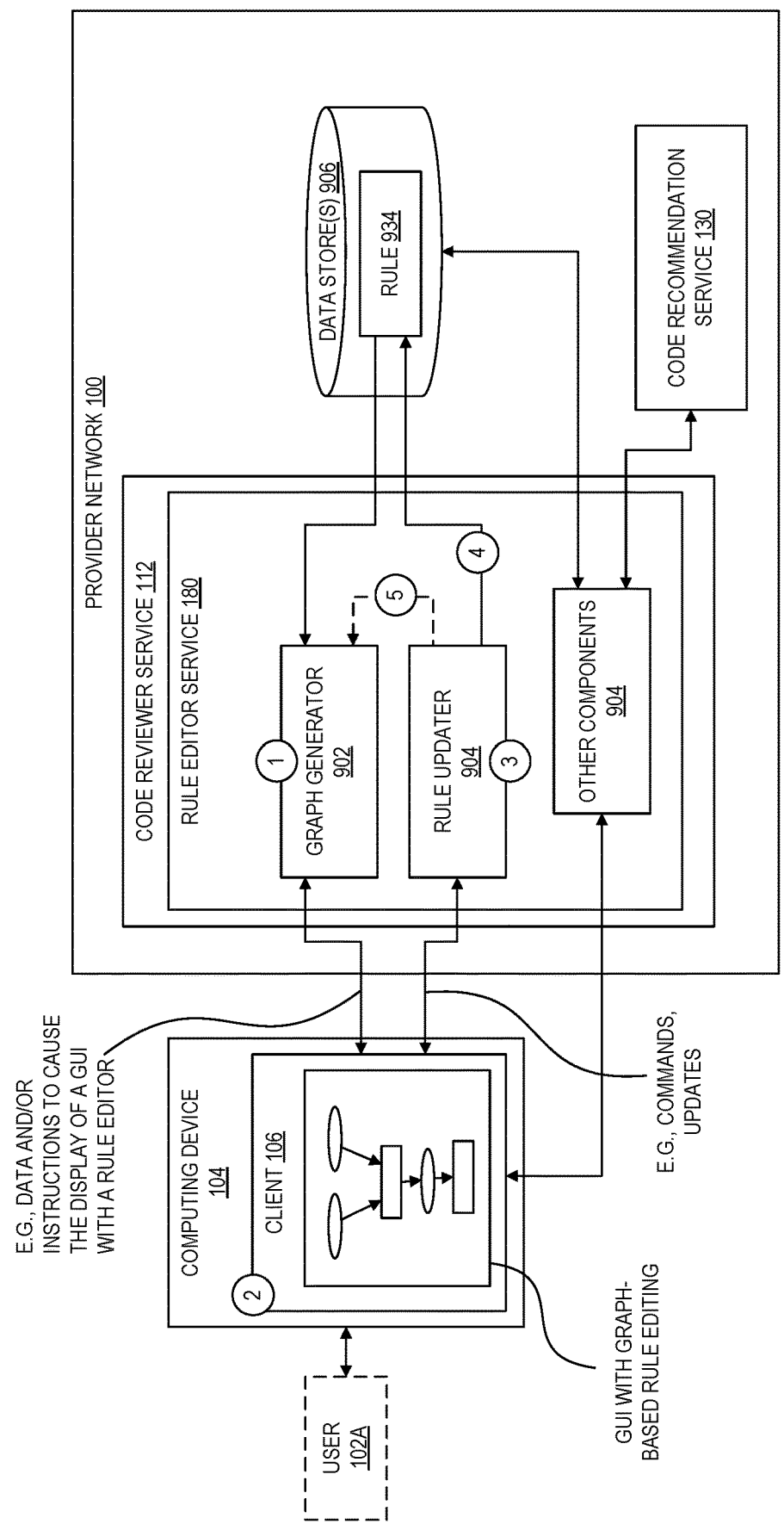
FIG. 9 illustrates an environment for editing code review rules according to some embodiments.

FIG. 9 illustrates an environment for editing code review rules according to some embodiments. At a high level, the code reviewer service 112 includes one or more components that send instructions and data to a user's device to cause that device to display a GUI in which graph-based editing of rules can be performed. Various elements of the GUI have associated methods or functions that, upon interaction with by the user, cause the electronic device to send requests or indications back to the code reviewer service component(s).

As illustrated, the provider network 100 includes the code reviewer service 112, and the code reviewer service 112 includes the rules editor service 180. In this example, the rules editor service 180 includes a graph generator 902 and a rule updater 904. The computing device 104 includes the client 106. In some embodiments, the client 106 is an application such as a web browser and the rules editor service 180 is a web server. A user interacts with the computing device 104 to, among other things, create and/or edit code review rules using a graph-based representation of the rules as described herein.

An exemplary set of operations for the illustrated editing environment is described with reference to encircled numbers "1" through "5" of FIG. 9. Note that interactions between the client 106 and the rule editor service 180 are via one or more APIs (not shown).

At circle 1, the rule editor service fetches a particular text-based rule 934 from data store(s) 906. The graph generator 902 translates the rule 934 from its original text-based form to one or more instructions and/or data structures that can be used to display and edit a graph-based rule. For example, the graph generator 902 can read rule 934 in the text format, identify the various nodes (e.g., data nodes and action nodes) as well as their relations (e.g., edges) and construct one or more instructions and/or data structures that, when used, display the rule in graph form. Additionally, the graph generator 902 can send various instructions related to various other GUI elements and associated operations that can be performed within the GUI environment (e.g., accessing a rule, saving a rule, testing a rule, etc.). In some embodiments, a web browser serves as the client 106 and displays the GUI. The graph generator 902 may generate a data structure containing the description of a graph according to a supported language or library available to the web browser and one or more instructions to cause the web browser to render a graph according to a graph description (e.g., data and/or instructions) generated by the graph generator 902.

Note that in the case of a new rule being created, the graph generator may send one or more instructions to invoke a graph-based editor in the GUI without the display of a graph (none exists at that point).

At circle 2, the client 106 receives the output of the graph generator 902, and, as illustrated, renders a GUI including the display of a graph-based rule and other GUI elements, if any. Various GUI elements and operations are described with reference to FIGS. 10-15.

At circle 3, the client 106 sends an indication of one or more changes to the graph. For example, a user interacting with the GUI may select and delete a particular graph element (e.g., a node, an edge), and a method associated with the delete operation can send an indication to the rule editor service 180. As another example, the user may add a new node and connect the new node to an existing node in the graph, and a method associated with the delete (and/or connect) operation can send an indication of the addition/connection to the rule editor service 180. Note that in some embodiments, indications are incremental. Under such a model, each user action that changes a graph is propagated from the client 106 to the rule editor service 180. In other embodiments, indications are batched. Under a batched model, user actions that change the graph are batched together and propagated from the client 106 to the rule editor service 180 (e.g., when a threshold number of edits is reached, when a user clicks a "save" button, after a certain period of time after the previous batch was sent, etc.).

At circle 4, the rule updater 904 processes the received indication(s) of changes to the graph by updating the rule 934. As mentioned, the text-based rule 934 may have a textual description of multiple linearized paths used to match code. The multiple linearized paths may have common nodes and/or edges, so a change to one node and/or edge in the visual editor may require changes to multiple portions of the text-based rule. The rule updater 904 makes these changes and stores the updated rule in the data store(s) 906.

In some embodiments, the rule updater 904 sends the updated rule or a delta of the updated rule to the graph generator 902 (as indicated at circle 5). The graph generator 902 translates the update(s) from to one or more instructions and/or data structures and sends those updates to the client 106. In other embodiments, updates to the graph displayed by the client 106 may be performed locally. In other words, when a user makes an edit to the graph, the client 106 updates the displayed graph to reflect the changes made by the user without invoking the graph generator 902.

In some embodiments, the rule editor service 180 may send the text-based rule 934 to the client 106 to allow a user to perform text-based edits. Upon making the text-based edits, the user can "save" the text-based rule, sending the updated rule or a delta reflecting changes from the original rule 934 to the rule editor service 180, which in turn can store the updated rule (applying the delta, if needed) in the data store(s) 906.

In some embodiments, the graph generator 902 and rule updater 904 may be implemented as code that is transmitted from the rule editor service 180 to the client 106 for execution within the local client environment. When executed, the graph generator and rule updater in the client environment can interface with the rule editor service 180 via one or more APIs (not shown) to create new rules, fetch existing rules, edit rules, etc. In this manner, operations within a GUI can be handled locally by the client 106.

As used herein, "causing" (or "to cause") the display of a GUI or an element or aspect of a GUI is used broadly to reflect the variety of techniques that can be used to cause an application to render a GUI. For example, web servers send code such as HyperText Markup Language, Javascript, etc. to web browsers, and web browsers interpret or execute the code to display a web page. In this sense, the web server (or other source of code) and/or the web browser (or other recipient of code) has caused the client to display a web page (individually or collectively). As another example, in some cases a server may send an application to a client for execution by the client. The code sent from the server to the client may invoke various modules or libraries on the client to render graphical elements and also to give functionality to those elements. For example, the code may include data in a data structure and a call to a library to invoke that will draw the graph based on the data.

As part of sending code to cause the rendering of a GUI, the code may further include functions to be assigned to various graphical elements drawn in the GUI. Exemplary functions include behaviors to perform upon the selection or activation of an element displayed in the GUI (e.g., clicking a button, selecting an image or text, selecting an edge or node, etc.).

The rule editor service 180 can include other components 904 to facilitate the display of other GUI elements. For example, the other components 904 may fetch a listing of rules from the data store(s) 906 and provide that listing to the client 106. As another example, in some embodiments each rule may have an associated set of one or more test cases against which the rule can be run to evaluate whether it evaluating code as expected. The other components 904 may fetch one or more test cases associated with a particular code review rule and send those test cases and any associated metadata to the client 106. As another example, the GUI may allow a user to submit the execution of a rule against code. The other components 904 can receive the request to execute the rule including an indication of the code to execute the rule against (e.g., user code at a particular location, a test case, etc.) and submit the evaluation to the code recommendation service 130 and relay the results back to the client 106.

FIGS. 10-16 illustrate exemplary graphical user interfaces for editing code review rules according to some embodiments. These GUIs are typically provided such as described with reference to FIG. 9 (e.g., from the rule editor service to a client 106).

Figure 10:
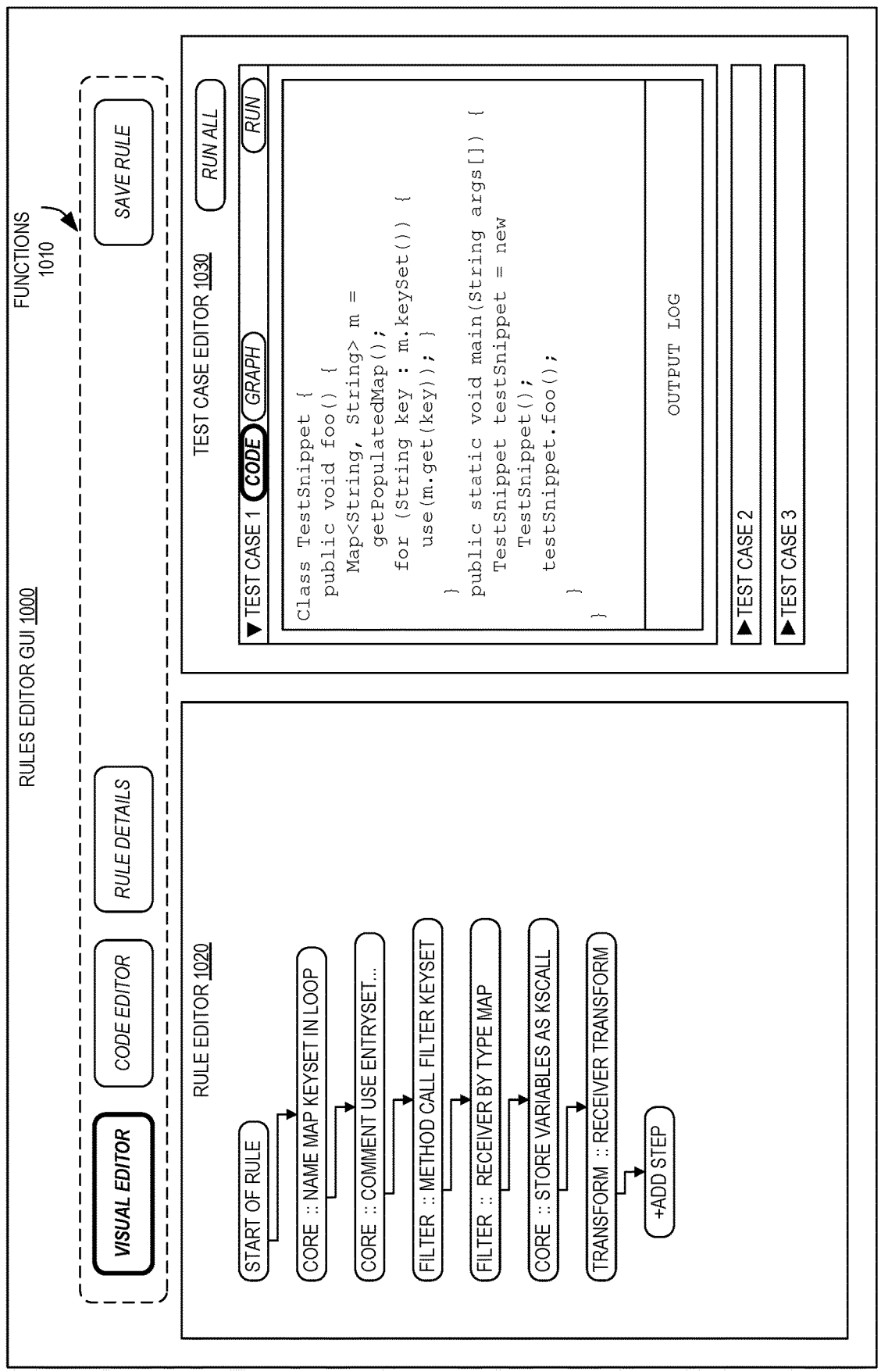
FIGS. 10-16 illustrate exemplary graphical user interfaces for editing code review rules according to some embodiments.

FIG. 10 illustrates an exemplary rules editor GUI 1000. GUI 1000 may be displayed by an application such as client 106. GUI 1000 includes a rule editor 1020 and a test case editor 1030.

The test case editor 1030 provides for the entry of code (as "test cases") against which the rule being created and/or edited can be tested. As shown, "Test Case 1" includes a "Run" function to run the rule against Test Case 1. Additionally, the test case editor 1030 includes a "Run All" function to run the rule against all of the associated test cases. "Test Case 1" further includes selections "CODE" and "GRAPH" to change between the display of the test case code and a graph representation of the code (although in other embodiments, both may be displayed simultaneously). As illustrated, "CODE" is selected, and the "Test Case 1" is showing code for a "TestSnippet" class. Additionally, the test case editor 1030 provides an output log portion to allow results of runs of test cases against the rule to be displayed. For example, code review service can apply the rule being edited to "Test Case 1" and an indication of whether the rule matched the test case can be provided in the output log.

Figure 14:
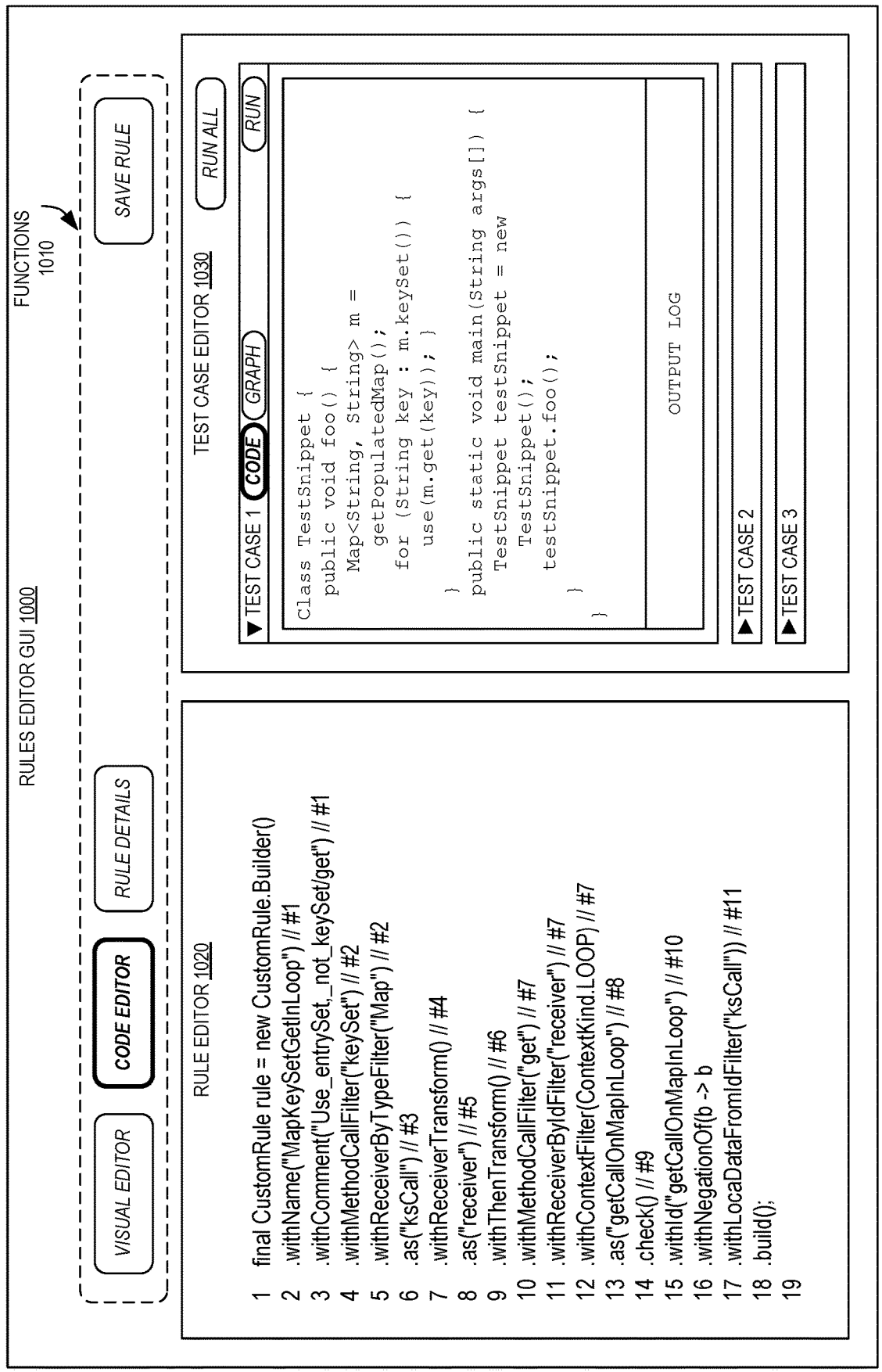
Figure 15:
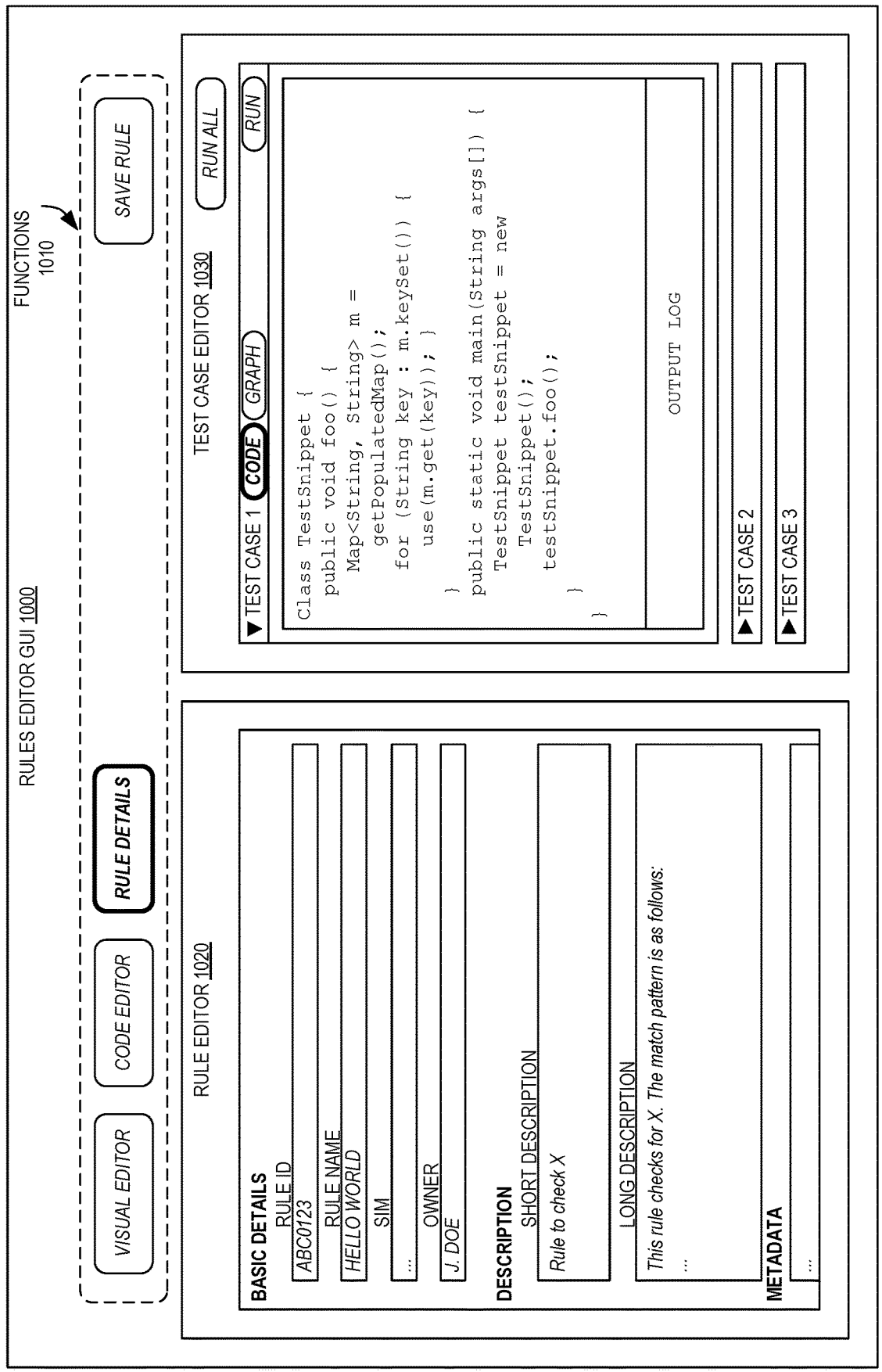

GUI 1000 includes functions 1010. Functions 1010 include a visual editor function, a code editor function, and a rule details function. In this exemplary GUI, these functions switch the rule editor 1020 between a "VISUAL EDITOR" (currently selected and shown), a text-based "CODE EDITOR" (an example of which is illustrated in FIG. 14), and a "RULE DETAILS" editor (an example of which is illustrated in FIG. 15). Of course, in some embodiments, a GUI may display one or more of the visual editor, text-based editor, and/or the rule details editor at the same time. Additionally, functions 1010 include a "Save Rule" function which will cause the rule being edited to be sent to and saved by the code reviewer service 112 such as via the rule editor service 180, the rule updater 904, etc.

The visual editor of the rule editor 1200 displays a graph (e.g., a PDG such as described herein) of the rule being edited, such as using by VQL as described herein. The graph includes nodes and edges indicating different sequences. Nodes may be characterized as data nodes and action nodes, although a more granular breakdown of node types may be used.

Figure 11:
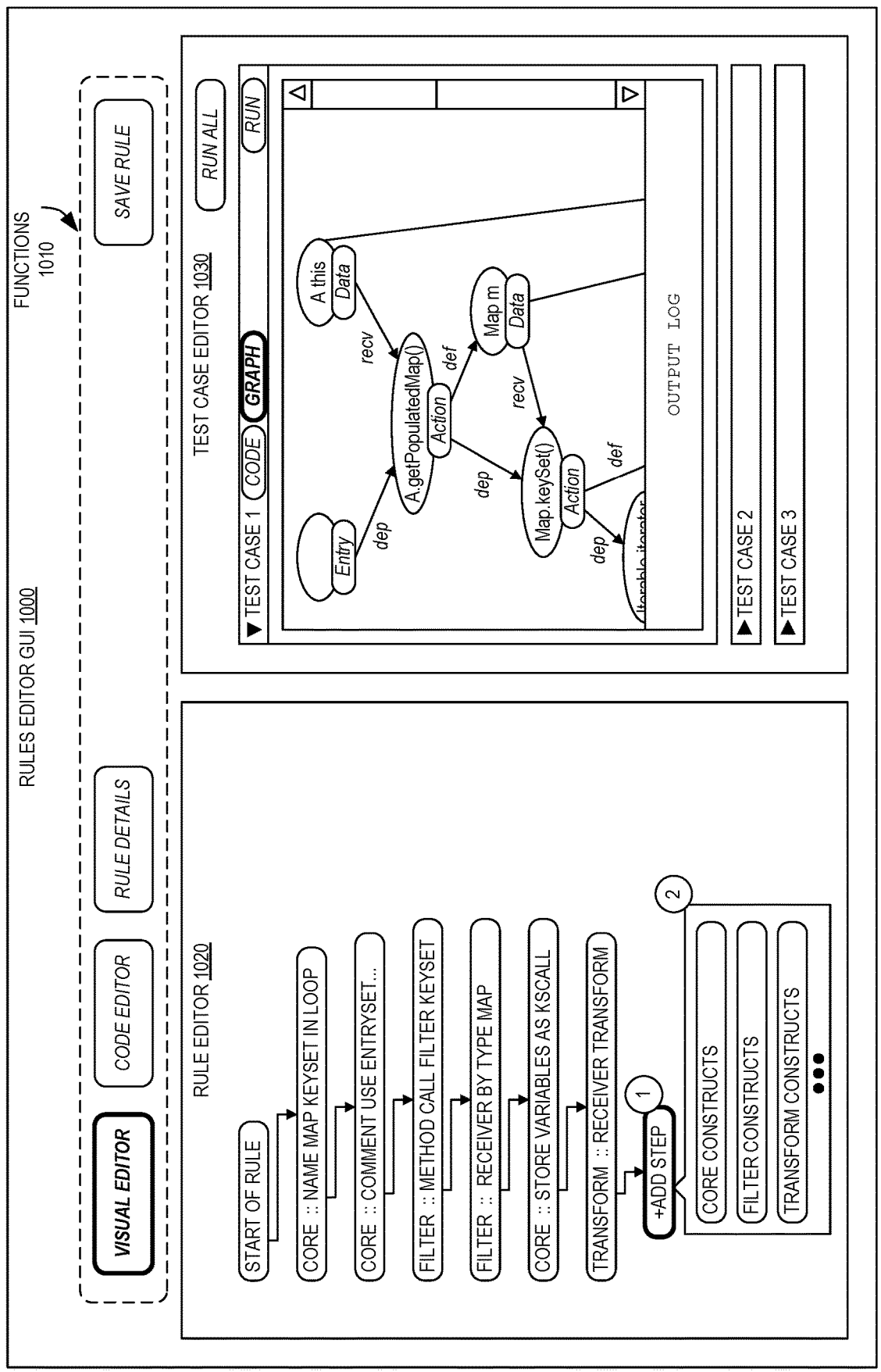

FIG. 11 illustrates the exemplary GUI 1000 in which a user has selected an "ADD STEP" element as indicated at circle "1." The application displaying the GUI (e.g., client 106) has sent an indication of that selection to the entity providing instructions and/or data for causing the display of the GUI 1000 (e.g., the rule editor service 180), and that entity has sent data and/or instructions to cause the application to display a node selector element as indicated at circle "2" that the user can navigate through to select the node they want to insert. Alternatively, that entity may have previously sent that data and/or instructions to the application to allow the application to display the node selector element upon the selection of the "ADD STEP" element.

Once the user has selected a node to add, the graph-based rule in the rule editor 1200 is updated along with the corresponding text-based code. As described herein, in some embodiments the updates may be performed locally (e.g., within the client 106) and propagated to the entity providing instructions and/or data for causing the display of the GUI 1000 (e.g., the rule editor service 180) (e.g., via the selection of the "SAVE" function). In other embodiments, the update is sent to the entity providing instructions and/or data for causing the display of the GUI 1000 once the user has selected the node to add. For example, if the user elects to add a node, the application sends a request to add the corresponding node (including some identifier of the node) to the rule editor service 180. The rule editor service 180 can then send data and/or instructions to the application to update the graph-based display of the rule in the rule editor 1020 to reflect the update.

Also illustrated in FIG. 11 is the "GRAPH" display option for "Test Case 1." In this case, the user has selected the "GRAPH" function of "Test Case 1" in the GUI 1000. The application displaying the GUI (e.g., client 106) has sent an indication of that selection to the entity providing instructions and/or data for causing the display of the GUI 1000 (e.g., the rule editor service 180), and that entity has sent data and/or instructions to cause the application to switch the test case editor 1030 to a graph form of the "TestSnippet" class. Alternatively, that entity may have previously sent that data and/or instructions to the application to allow the application to display the graph form of the "TestSnippet" class upon the selection of the "GRAPH" function of "Test Case 1."

Figure 12:
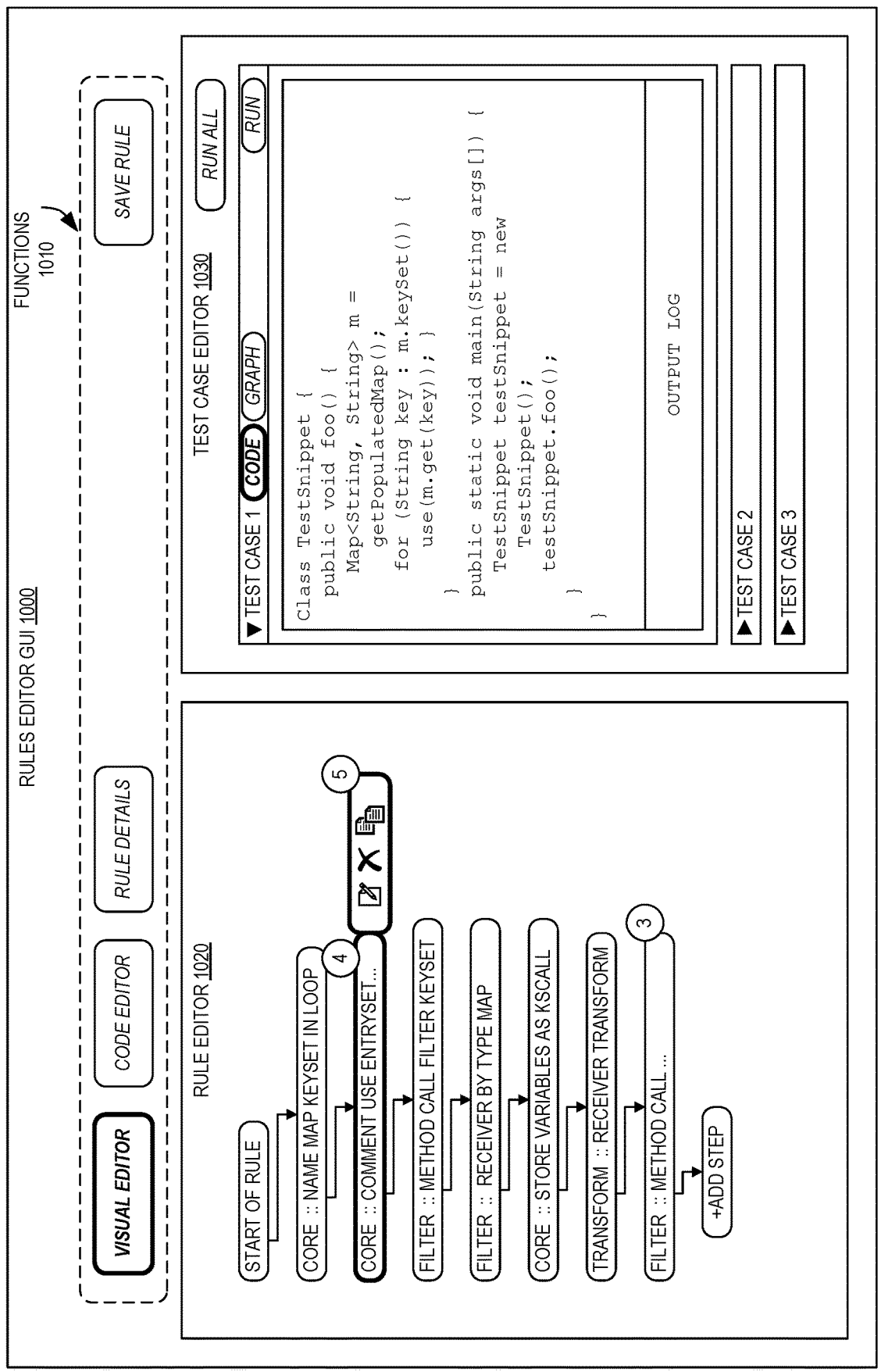

FIG. 12 illustrates the exemplary GUI 1000 in which a user has added a new node as indicated at circle "3" and described with reference to FIG. 11. In this example, the user added a node to match a method call.

Additionally, FIG. 12 illustrates the exemplary GUI 1000 in which the user has selected an existing node (the second CORE node) in the graph-based rule displayed in the rule editor 1020 as indicated at circle "4".

The application displaying the GUI (e.g., client 106) has sent an indication of that selection to the entity providing instructions and/or data for causing the display of the GUI 1000 (e.g., the rule editor service 180), and that entity has sent data and/or instructions to cause the application to display various operations that can be performed on the node such as "EDIT," "DELETE" and "COPY" as indicated at circle "5." Alternatively, that entity may have previously sent that data and/or instructions to the application to allow the application to display the node operations upon the selection of a node.

Once the user has selected an operation to perform on an existing node, the graph-based rule in the rule editor 1200 is updated along with the corresponding text-based code. As described herein, in some embodiments the updates may be performed locally (e.g., within the client 106) and propagated to the entity providing instructions and/or data for causing the display of the GUI 1000 (e.g., the rule editor service 180) (e.g., via the selection of the "SAVE" function). In other embodiments, the update is sent to the entity providing instructions and/or data for causing the display of the GUI 1000 once the user has selected the operation to perform on the node. For example, if the user elects to delete the node, the application sends a request to delete the node (including some identifier of the node) to the rule editor service 180. The rule editor service 180 can then send data and/or instructions to the application to update the graph-based display of the rule in the rule editor 1020 to reflect the update. As another example, if the user elects to edit the node, instructions to display an edit element can be executed to allow the user to edit the node (e.g., the comment if a comment node, a method name if a method filter node etc.) (not shown).

Figure 13:
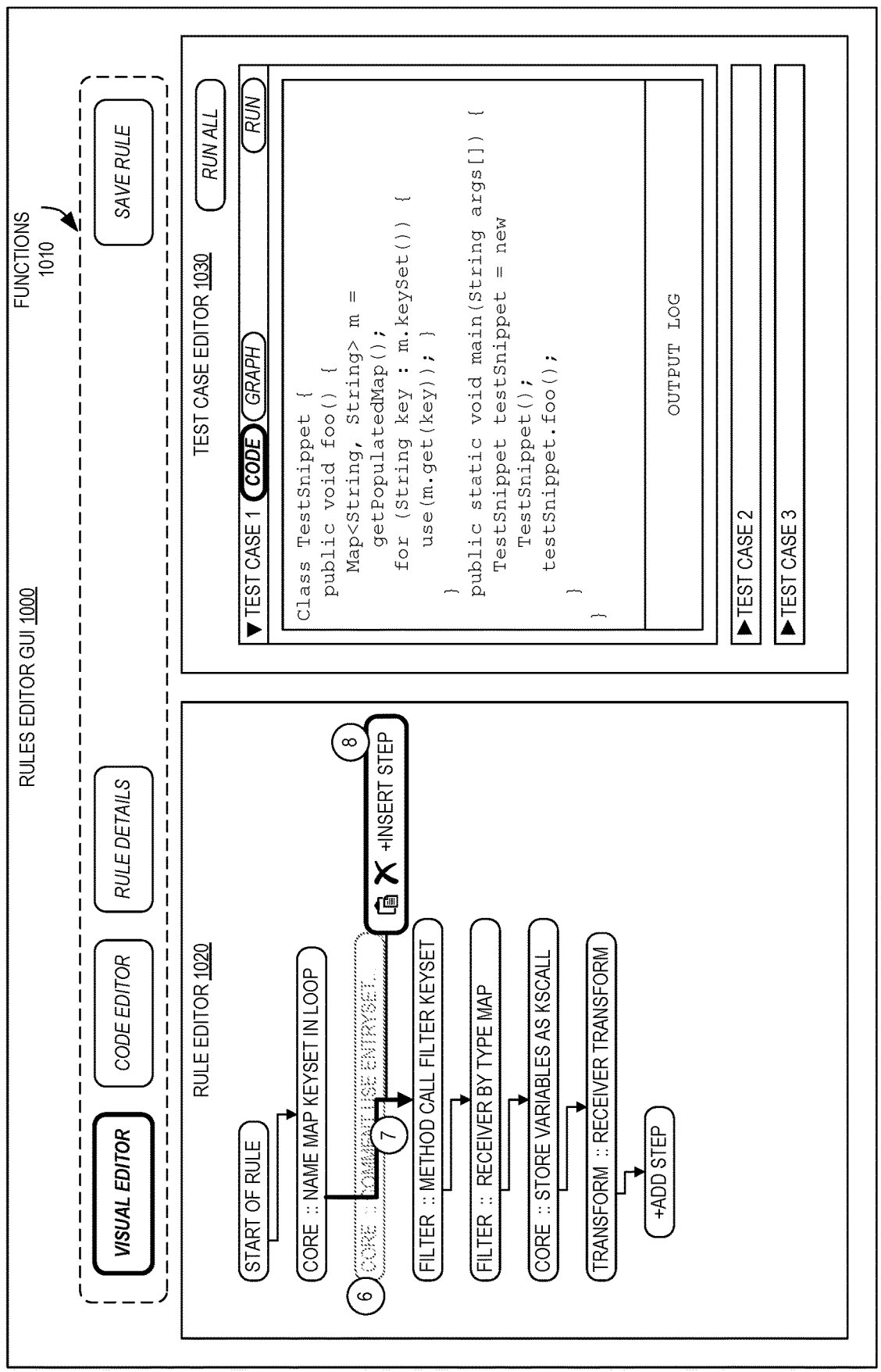

FIG. 13 illustrates the exemplary GUI 1000 in which a user has deleted an existing node as indicated at circle "6." In this example, the user deleted a comment node (faded for illustration purposes here to show its absence).

Additionally, FIG. 13 illustrates the exemplary GUI 1000 in which the user has selected an existing edge (connecting the nodes before and after the now-deleted node) in the graph-based rule displayed in the rule editor 1020 as indicated at circle "7".

The application displaying the GUI (e.g., client 106) has sent an indication of that selection to the entity providing instructions and/or data for causing the display of the GUI 1000 (e.g., the rule editor service 180), and that entity has sent data and/or instructions to cause the application to display various operations that can be performed on the edge such as "PASTE" (e.g., to paste a previously copied node), "DELETE" (e.g., to remove the edge), and "INSERT STEP" (e.g., to insert a new step along that edge) as indicated at circle "8." Alternatively, that entity may have previously sent that data and/or instructions to the application to allow the application to display the edge operations upon the selection of an edge.

Again, once the user has selected an operation to perform on an existing edge, the graph-based rule in the rule editor 1200 is updated along with the corresponding text-based code. As described herein, in some embodiments the updates may be performed locally (e.g., within the client 106) and propagated to the entity providing instructions and/or data for causing the display of the GUI 1000 (e.g., the rule editor service 180) (e.g., via the selection of the "SAVE" function). In other embodiments, the update is sent to the entity providing instructions and/or data for causing the display of the GUI 1000 once the user has selected the operation to perform on the edge. For example, if the user elects to delete the edge, the application sends a request to delete the edge (including some identifier of the edge) to the rule editor service 180. The rule editor service 180 can then send data and/or instructions to the application to update the graph-based display of the rule in the rule editor 1020 to reflect the update. If the user elects to edit the node, an edit element can be displayed allowing the user to edit the node (e.g., the comment if a comment node, a method name if a method filter node etc.) (not shown).

FIG. 14 illustrates the GUI 1000 in which the user has selected the text-based "CODE EDITOR" function 1010. As illustrated, the rule editor 1020 switches to a text-based editor that displays the rule that can be edited in text (e.g., as GQL or some other text-based rule description). Changes made to the graph in the "VISUAL EDITOR" are propagated into the text-based rule and vice versa, either locally within the application or via the rule editor service 180 as described herein. For example, if the COMMENT node was deleted between FIGS. 12 and 13, the .withComment on line 3 in the text-based editor would be deleted.

As in other cases where the user updates the rule, edits to the text-based rule editor 1020 can be performed locally and later propagated to the entity providing instructions and/or data for causing the display of the GUI 1000 (e.g., the rule editor service 180) (e.g., via the selection of the "SAVE" function) or can be sent to the entity providing instructions and/or data for causing the display of the GUI 1000 as the edits are made.

FIG. 15 illustrates the GUI 1000 in which the user has selected the "RULE DETAILS" function 1010. As illustrated, the rule editor 1020 displays one or more fields that a user can edit and can be stored as or with metadata associated with the rule (e.g., in the data store(s) 906). Exemplary fields include a rule ID, a rule owner, rule description(s), etc.

As in other cases where the user updates the rule, edits to rule details rule editor 1020 can be performed locally and later propagated to the entity providing instructions and/or data for causing the display of the GUI 1000 (e.g., the rule editor service 180) (e.g., via the selection of the "SAVE" function) or can be sent to the entity providing instructions and/or data for causing the display of the GUI 1000 as the edits are made.

Note that the GUI environments illustrated in FIGS. 10-15 allow users to manually refine rules. For example, if a customer is trying to modify a rule to match a particular sequence of code, they can paste or otherwise insert the sequence of code into the GUI as a test case and display the associated PDG (e.g., such as shown in FIGS. 10-11). Then, the user can modify the graph of the rule (e.g., the left portion of FIG. 11) to match the graph of the code (e.g., the right portion of FIG. 11). As another example, a user can use the GUI to edit a rule postcondition to match good examples such as those illustrated in FIG. 6.

Note that although the illustration and description of the GUI environments in FIGS. 10-15 provide certain techniques for providing a graph-based editing environment to a user, other techniques are possible. For example, drop-down menus, buttons, and other GUI elements can be used to provide various operations such as adding new graph elements, deleting graph elements, editing existing graph elements, etc.

Figure 16:
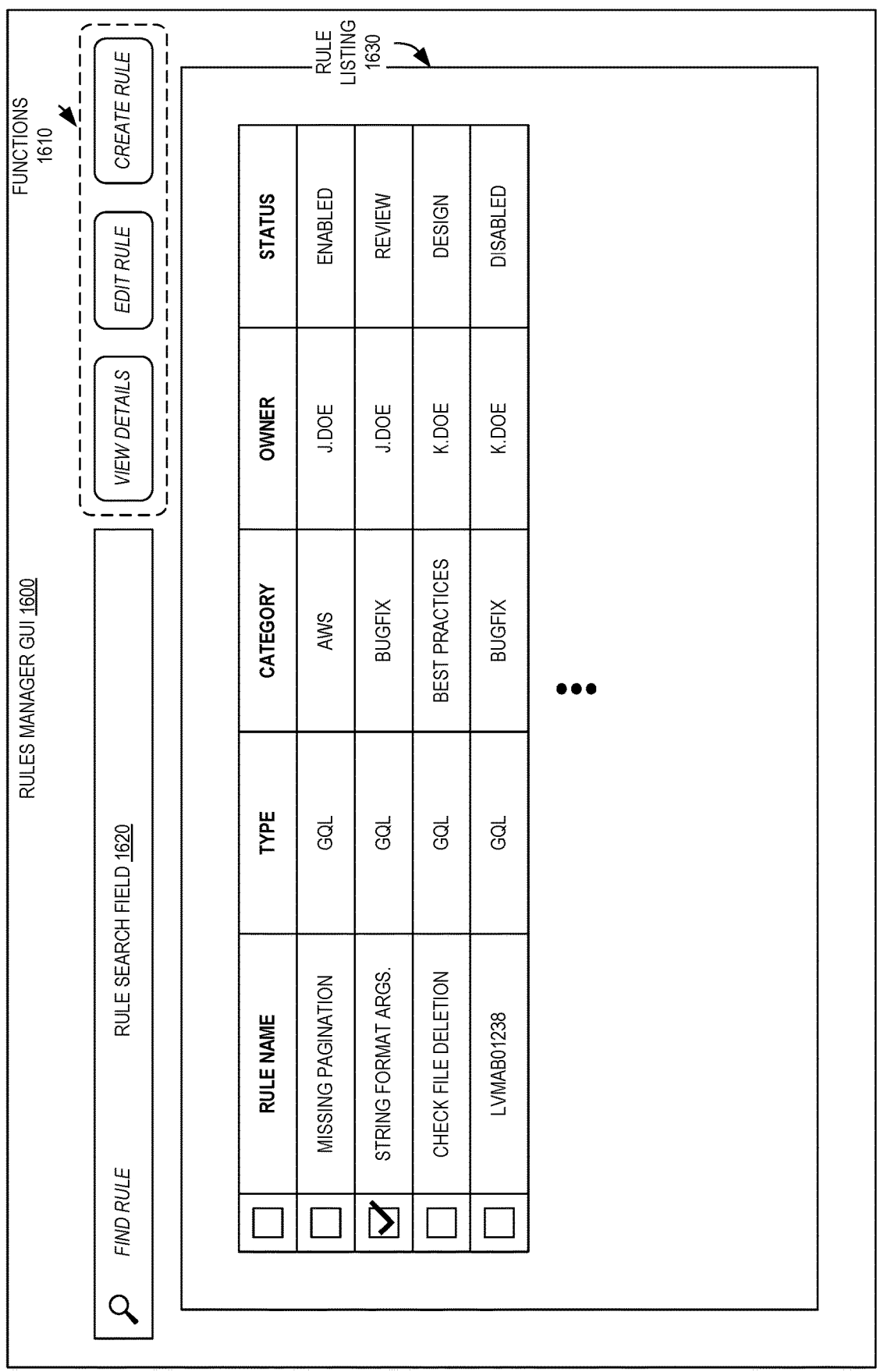

FIG. 16 illustrates an exemplary rules manager GUI 1600. GUI 1600 may be displayed by an application such as client 106. GUI 1600 includes functions 1610, a rule search field 1602, and a rule listing 1630. Functions 1610 include a "VIEW DETAILS" function (e.g., to view the "RULE DETAILS" of a rule), an "EDIT RULE" function (e.g., to open the rule editor GUI 1000 for an existing rule), and a "CREATE RULE" function (e.g., to open the rule editor GUI 1000 for a new rule). The rule search field can perform a search of the rules available to the user and provide a results list in the rule listing 1630. For example, the user can enter a search term or term(s), the application running the GUI (e.g., the client 106) can send those terms to the rule editor service 180, the rule editor service 180 can search for the term(s) in the rules stored in the data stores 906 and return a listing of results to the application for display in the rule listing 1630.

As shown, the exemplary rule listing 1630 includes various columns representing different characteristics of the rules (whether filtered by keyword or an exhaustive list of all available rules). Exemplary rule characteristics include a rule name, rule type, category, owner, and status.

Figure 17:
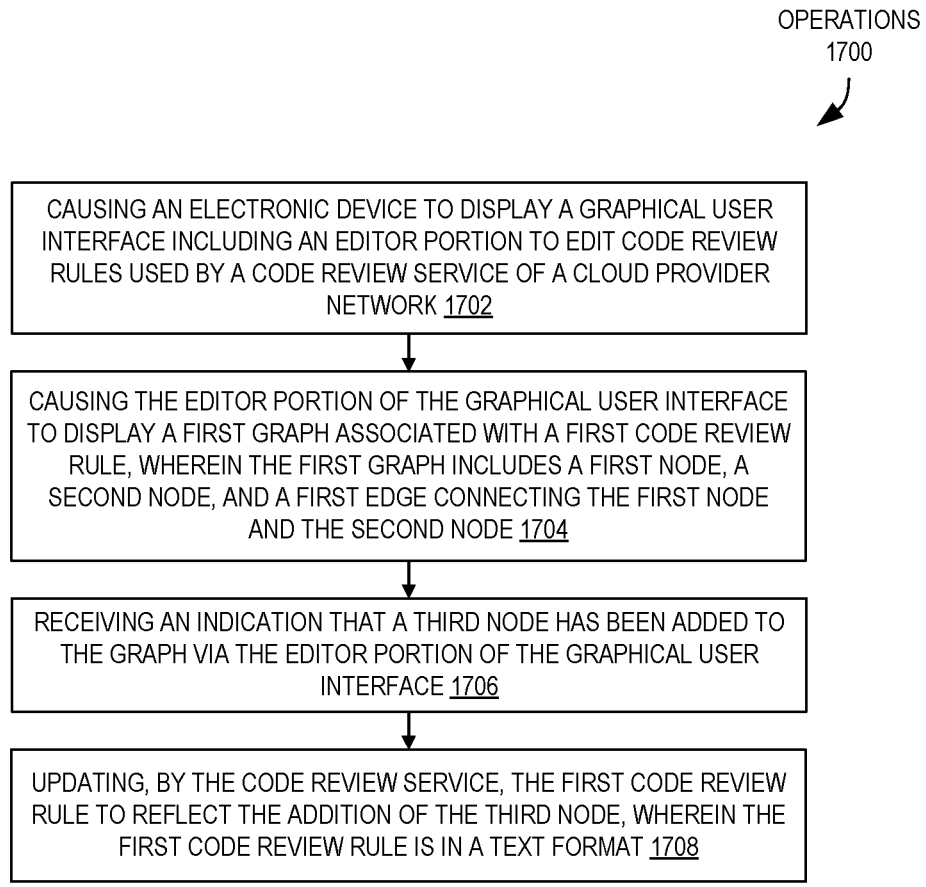
FIG. 17 is a flow diagram illustrating operations of a method for editing code review rules according to some embodiments.

FIG. 17 is a flow diagram illustrating operations 1700 of a method for graph-based editing of rules used to evaluate code by a code reviewer service according to some embodiments. Some or all of the operations 1700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1700 are performed by the rule editor service 180 of the other figures.

The operations 1700 include, at block 1702, causing an electronic device to display a graphical user interface including an editor portion to edit code review rules used by a code review service of a cloud provider network.

The operations 1700 further include, at block 1704, causing the editor portion of the graphical user interface to display a first graph associated with a first code review rule, wherein the first graph includes a first node, a second node, and a first edge connecting the first node and the second node.

The operations 1700 further include, at block 1706, receiving an indication that a third node has been added to the graph via the editor portion of the graphical user interface.

The operations 1700 further include, at block 1708, updating, by the code review service, the first code review rule to reflect the addition of the third node, wherein the first code review rule is in a text format.

Figure 18:
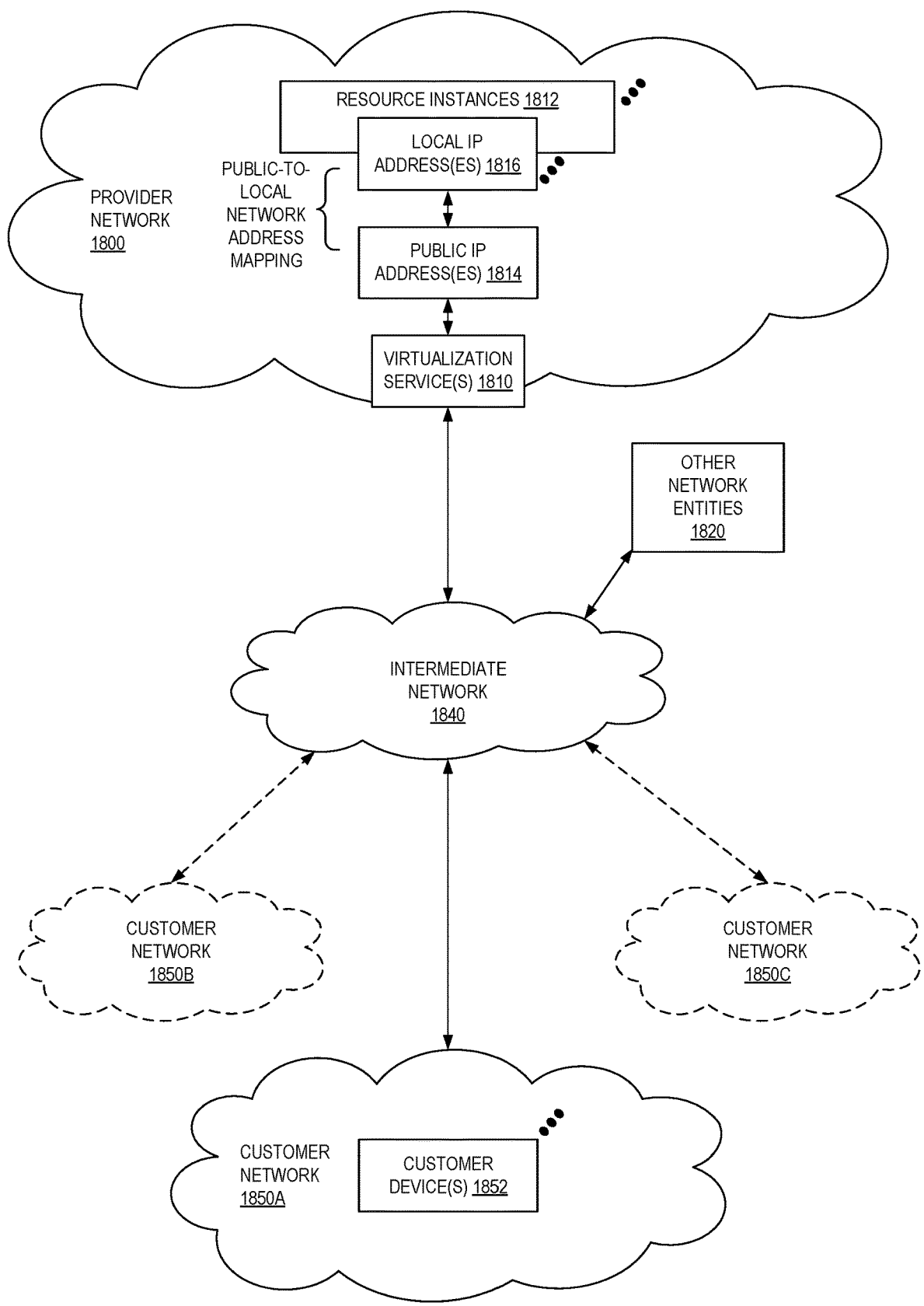
FIG. 18 illustrates an example provider network environment according to some embodiments.

FIG. 18 illustrates an example provider network (or "service provider system") environment according to some embodiments. A provider network 1800 can provide resource virtualization to customers via one or more virtualization services 1810 that allow customers to purchase, rent, or otherwise obtain instances 1812 of virtualized resources, including but not limited to computation and storage resources, implemented on devices within the provider network or networks in one or more data centers. Local Internet Protocol (IP) addresses 1816 can be associated with the resource instances 1812; the local IP addresses are the internal network addresses of the resource instances 1812 on the provider network 1800. In some embodiments, the provider network 1800 can also provide public IP addresses 1814 and/or public IP address ranges (e.g., Internet Protocol version 4 (IPv4) or Internet Protocol version 6 (IPv6) addresses) that customers can obtain from the provider 1800.

Conventionally, the provider network 1800, via the virtualization services 1810, can allow a customer of the service provider (e.g., a customer that operates one or more customer networks 1850A-1850C (or "client networks") including one or more customer device(s) 1852) to dynamically associate at least some public IP addresses 1814 assigned or allocated to the customer with particular resource instances 1812 assigned to the customer. The provider network 1800 can also allow the customer to remap a public IP address 1814, previously mapped to one virtualized computing resource instance 1812 allocated to the customer, to another virtualized computing resource instance 1812 that is also allocated to the customer. Using the virtualized computing resource instances 1812 and public IP addresses 1814 provided by the service provider, a customer of the service provider such as the operator of the customer network(s) 1850A-1850C can, for example, implement customer-specific applications and present the customer's applications on an intermediate network 1840, such as the Internet. Other network entities 1820 on the intermediate network 1840 can then generate traffic to a destination public IP address 1814 published by the customer network(s) 1850A-1850C; the traffic is routed to the service provider data center, and at the data center is routed, via a network substrate, to the local IP address 1816 of the virtualized computing resource instance 1812 currently mapped to the destination public IP address 1814. Similarly, response traffic from the virtualized computing resource instance 1812 can be routed via the network substrate back onto the intermediate network 1840 to the source entity 1820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1800; a customer can then assign their allocated public IP addresses to particular resource instances allocated to the customer. These public IP addresses can be referred to as customer public IP addresses, or simply customer IP addresses. Instead of being assigned by the provider network 1800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 19:
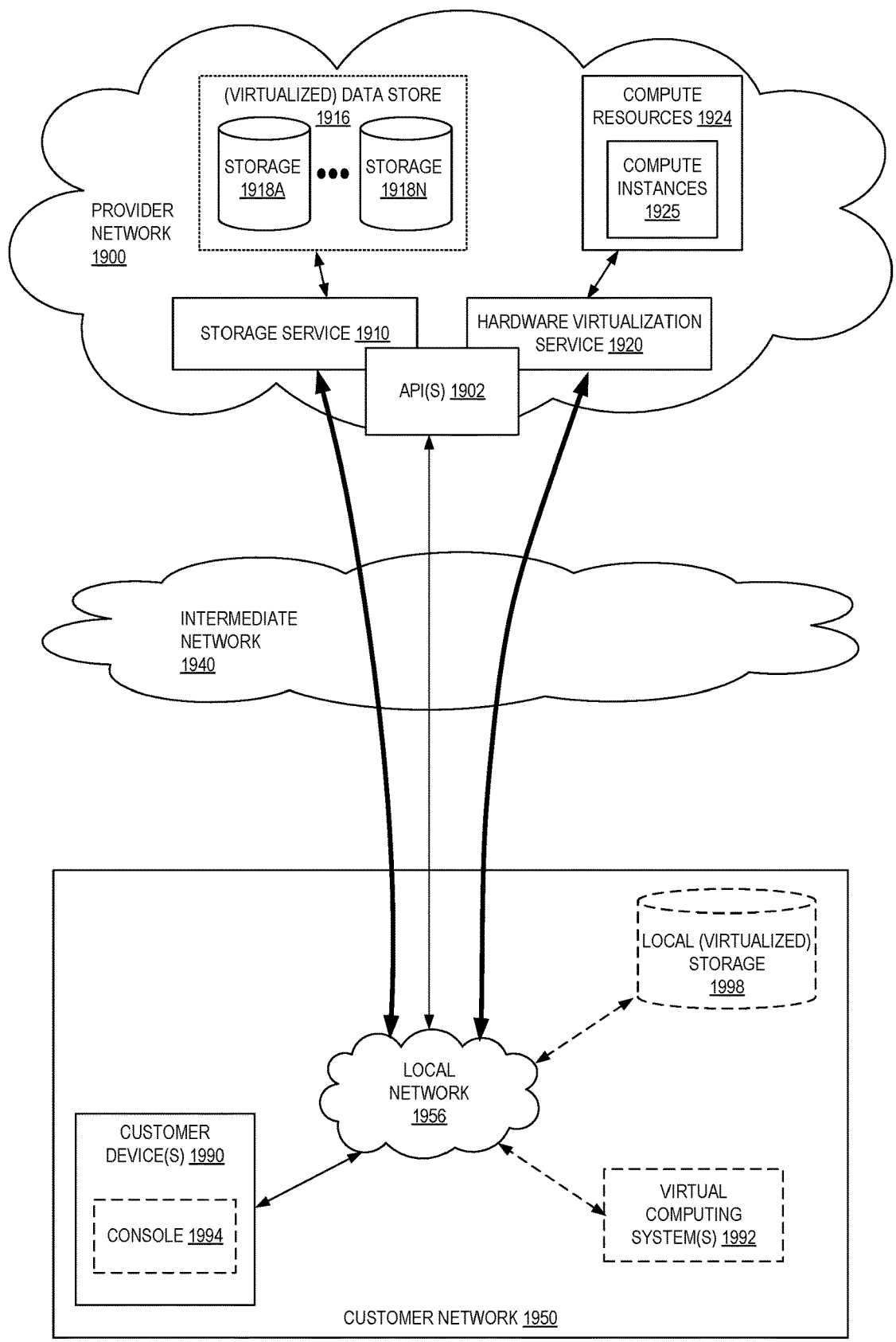
FIG. 19 is a block diagram of an example provider network that provides a storage service and a hardware virtualization service to customers according to some embodiments.

FIG. 19 is a block diagram of an example provider network environment that provides a storage service and a hardware virtualization service to customers, according to some embodiments. A hardware virtualization service 1920 provides multiple compute resources 1924 (e.g., compute instances 1925, such as VMs) to customers. The compute resources 1924 can, for example, be provided as a service to customers of a provider network 1900 (e.g., to a customer that implements a customer network 1950). Each computation resource 1924 can be provided with one or more local IP addresses. The provider network 1900 can be configured to route packets from the local IP addresses of the compute resources 1924 to public Internet destinations, and from public Internet sources to the local IP addresses of the compute resources 1924.

The provider network 1900 can provide the customer network 1950, for example coupled to an intermediate network 1940 via a local network 1956, the ability to implement virtual computing systems 1992 via the hardware virtualization service 1920 coupled to the intermediate network 1940 and to the provider network 1900. In some embodiments, the hardware virtualization service 1920 can provide one or more APIs 1902, for example a web services interface, via which the customer network 1950 can access functionality provided by the hardware virtualization service 1920, for example via a console 1994 (e.g., a web-based application, standalone application, mobile application, etc.) of a customer device 1990. In some embodiments, at the provider network 1900, each virtual computing system 1992 at the customer network 1950 can correspond to a computation resource 1924 that is leased, rented, or otherwise provided to the customer network 1950.

From an instance of the virtual computing system(s) 1992 and/or another customer device 1990 (e.g., via console 1994), the customer can access the functionality of a storage service 1910, for example via the one or more APIs 1902, to access data from and store data to storage resources 1918A-1918N of a virtual data store 1916 (e.g., a folder or "bucket," a virtualized volume, a database, etc.) provided by the provider network 1900. In some embodiments, a virtualized data store gateway (not shown) can be provided at the customer network 1950 that can locally cache at least some data, for example frequently accessed or critical data, and that can communicate with the storage service 1910 via one or more communications channels to upload new or modified data from a local cache so that the primary store of data (the virtualized data store 1916) is maintained. In some embodiments, a user, via the virtual computing system 1992 and/or another customer device 1990, can mount and access virtual data store 1916 volumes via the storage service 1910 acting as a storage virtualization service, and these volumes can appear to the user as local (virtualized) storage 1998.

While not shown in FIG. 19, the virtualization service(s) can also be accessed from resource instances within the provider network 1900 via the API(s) 1902. For example, a customer, appliance service provider, or other entity can access a virtualization service from within a respective virtual network on the provider network 1900 via the API(s) 1902 to request allocation of one or more resource instances within the virtual network or within another virtual network.

Illustrative Systems

Figure 20:
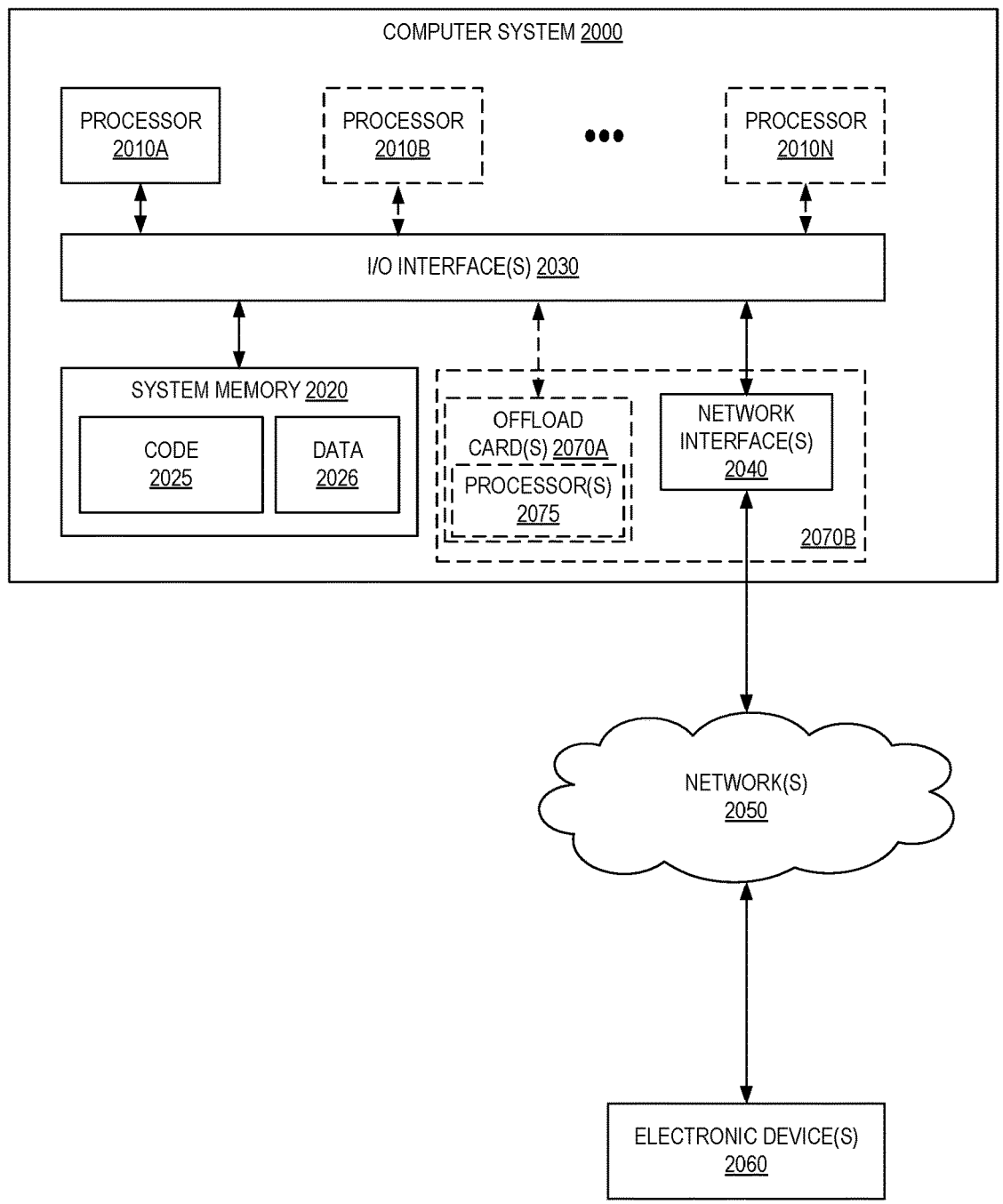
FIG. 20 is a block diagram illustrating an example computer system that can be used in some embodiments.

In some embodiments, a system that implements a portion or all of the techniques described herein can include a general-purpose computer system, such as the computer system 2000 illustrated in FIG. 20, that includes, or is configured to access, one or more computer-accessible media. In the illustrated embodiment, the computer system 2000 includes one or more processors 2010 coupled to a system memory 2020 via an input/output (I/O) interface 2030. The computer system 2000 further includes a network interface 2040 coupled to the I/O interface 2030. While FIG. 20 shows the computer system 2000 as a single computing device, in various embodiments the computer system 2000 can include one computing device or any number of computing devices configured to work together as a single computer system 2000.

In various embodiments, the computer system 2000 can be a uniprocessor system including one processor 2010, or a multiprocessor system including several processors 2010 (e.g., two, four, eight, or another suitable number). The processor(s) 2010 can be any suitable processor(s) capable of executing instructions. For example, in various embodiments, the processor(s) 2010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 2010 can commonly, but not necessarily, implement the same ISA.

The system memory 2020 can store instructions and data accessible by the processor(s) 2010. In various embodiments, the system memory 2020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 2020 as code 2025 and data 2026. For example, code 2025 and data 2026 can include the code and data to implement the rule editor service 180 as described herein, including by causing an application to display a visual editing environment for code review rules as described herein. As another example, the code 2025 and data 2026 can include the code and data received from the rule editor service 180 at a client electronic device to cause it to display a visual editing environment for code review rules as described herein.

In some embodiments, the I/O interface 2030 can be configured to coordinate I/O traffic between the processor 2010, the system memory 2020, and any peripheral devices in the device, including the network interface 2040 and/or other peripheral interfaces (not shown). In some embodiments, the I/O interface 2030 can perform any necessary protocol, timing, or other data transformations to convert data signals from one component (e.g., the system memory 2020) into a format suitable for use by another component (e.g., the processor 2010). In some embodiments, the I/O interface 2030 can include support for devices attached through various types of peripheral buses, such as a variant of the Peripheral Component Interconnect (PCI) bus standard or the Universal Serial Bus (USB) standard, for example. In some embodiments, the function of the I/O interface 2030 can be split into two or more separate components, such as a north bridge and a south bridge, for example. Also, in some embodiments, some or all of the functionality of the I/O interface 2030, such as an interface to the system memory 2020, can be incorporated directly into the processor 2010.

The network interface 2040 can be configured to allow data to be exchanged between the computer system 2000 and other devices 2060 attached to a network or networks 2050, such as other computer systems or devices as illustrated in FIG. 1, for example. In various embodiments, the network interface 2040 can support communication via any suitable wired or wireless general data networks, such as types of Ethernet network, for example. Additionally, the network interface 2040 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 2000 includes one or more offload cards 2070A or 2070B (including one or more processors 2075, and possibly including the one or more network interfaces 2040) that are connected using the I/O interface 2030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 2000 can act as a host electronic device (e.g., operating as part of a hardware virtualization service) that hosts compute resources such as compute instances, and the one or more offload cards 2070A or 2070B execute a virtualization manager that can manage compute instances that execute on the host electronic device. As an example, in some embodiments the offload card(s) 2070A or 2070B can perform compute instance management operations, such as pausing and/or un-pausing compute instances, launching and/or terminating compute instances, performing memory transfer/copying operations, etc. These management operations can, in some embodiments, be performed by the offload card(s) 2070A or 2070B in coordination with a hypervisor (e.g., upon a request from a hypervisor) that is executed by the other processors 2010A-2010N of the computer system 2000. However, in some embodiments the virtualization manager implemented by the offload card(s) 2070A or 2070B can accommodate requests from other entities (e.g., from compute instances themselves), and cannot coordinate with (or service) any separate hypervisor.

In some embodiments, the system memory 2020 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 2000 via the I/O interface 2030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 2000 as the system memory 2020 or another type of memory. Further, a computer-accessible medium can include transmission media or signals such as electrical, electromagnetic, or digital signals, conveyed via a communication medium such as a network and/or a wireless link, such as can be implemented via the network interface 2040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C #or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 1918A-1918N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   causing an electronic device to display a graphical user interface including an editor portion to edit code review rules used by a code review service of a cloud provider network;
   causing the editor portion of the graphical user interface to display a first graph associated with a first code review rule, wherein the first graph includes a first node, a second node, and a first edge connecting the first node and the second node;
   receiving an indication that a third node has been added to the first graph via the editor portion of the graphical user interface;
   updating, by the code review service, the first code review rule to reflect the addition of the third node, wherein the first code review rule is in a text format;
   receiving, from the electronic device, an indication to review at least a portion of source code;
   identifying, by the code review service, a first sequence of operations in the portion of source code that match a second sequence of operations specified by the first code review rule; and
   providing an indication of a location of the first sequence of operations in the portion of source code to the electronic device.

2. The computer-implemented method of claim 1, wherein edges in the first graph correspond to data-flow or control dependencies between nodes, wherein nodes in the first graph correspond to data or action nodes, and wherein the first graph represents a sequence of operations to match buggy code by the code review service.

3. The computer-implemented method of claim 1, wherein the graphical user interface further includes a test case editor portion, the test case editor portion providing for entry of code against which the first code review rule can be evaluated.

4. A computer-implemented method comprising:
   causing an electronic device to display a graphical user interface including an editor portion to edit code review rules used by a code review service of a cloud provider network;
   causing the editor portion of the graphical user interface to display a first graph associated with a first code review rule, wherein the first graph includes a first node, a second node, and a first edge connecting the first node and the second node;
   receiving an indication that a third node has been added to the first graph via the editor portion of the graphical user interface; and
   updating, by the code review service, the first code review rule to reflect the addition of the third node, wherein the first code review rule is in a text format.

5. The computer-implemented method of claim 4, wherein edges in the first graph correspond to data-flow or control dependencies between nodes, wherein nodes in the first graph correspond to data or action nodes, and wherein the first graph represents a sequence of operations to match buggy code by the code review service.

6. The computer-implemented method of claim 4, further comprising: upon selection of a particular node in the first graph in the editor portion of the graphical user interface, causing a display of one or more operations that can be performed on the particular node, wherein the one or more operations include at least one of an edit operation and a delete operation.

7. The computer-implemented method of claim 6, further comprising:
   receiving an indication of a selection of the delete operation for the particular node; and
   updating, by the code review service, the first code review rule to reflect the deletion of the particular node.

8. The computer-implemented method of claim 4, further comprising: upon selection of a particular edge in the first graph in the editor portion of the graphical user interface, causing a display of one or more operations that can be performed on the particular edge, wherein the one or more operations include at least one of a delete operation and an insert node option.

9. The computer-implemented method of claim 8, further comprising:
   receiving an indication of a selection of the delete operation for the particular edge; and
   updating, by the code review service, the first code review rule to reflect the deletion of the particular edge.

10. The computer-implemented method of claim 4, wherein the graphical user interface further includes a test case editor portion, the test case editor portion providing for entry of code against which the first code review rule can be evaluated.

11. The computer-implemented method of claim 10, further comprising:
   receiving an indication to run a first test case via the test case editor portion of the graphical user interface;
   determine, by the code review service, whether a first sequence of operations in the first test case matches a second sequence of operations specified by the first code review rule; and
   causing the graphical user interface to display an indication of whether the first sequence of operations in the first test case matched a second sequence of operations specified by the first code review rule.

12. The computer-implemented method of claim 4, further comprising:
   receiving, from the electronic device, an indication to review at least a portion of source code;
   identifying a first sequence of operations in the portion of source code that match a second sequence of operations specified by the first code review rule; and
   providing an indication of a location of the first sequence of operations in the portion of source code to the electronic device.

13. The computer-implemented method of claim 4, wherein updating the first code review rule to reflect the addition of the third node includes modifying a plurality of lines of code in the first code review rule.

14. A system comprising:
   a first one or more electronic devices to implement a data store in a multi-tenant provider network, the data store to store a plurality of code review rules; and
   a second one or more electronic devices to implement a code reviewer service in the multi-tenant provider network, the code reviewer service including instructions that upon execution cause the code reviewer service to:
      cause an electronic device to display a graphical user interface including an editor portion to edit code review rules;
      retrieve a first code review rule from the data store;
      cause the editor portion of the graphical user interface to display a first graph associated with the first code review rule, wherein the first graph includes a first node, a second node, and a first edge connecting the first node and the second node;
      receive an indication that a third node has been added to the first graph via the editor portion of the graphical user interface;
      update the first code review rule to reflect the addition of the third node, wherein the first code review rule is in a text format; and
      store the updated first code review rule in the data store.

15. The system of claim 14, wherein edges in the first graph correspond to data-flow or control dependencies between nodes, wherein nodes in the first graph correspond to data or action nodes, and wherein the first graph represents a sequence of operations to match buggy code by the code review service.

16. The system of claim 14, wherein the code reviewer service includes further instructions that upon execution cause the code reviewer service to cause a display of one or more operations that can be performed on a particular node upon selection of the particular node in the first graph in the editor portion of the graphical user interface, wherein the one or more operations include at least one of an edit operation and a delete operation.

17. The system of claim 16, wherein the code reviewer service includes further instructions that upon execution cause the code reviewer service to:
   receive an indication of a selection of the delete operation for the particular node; and
   update the first code review rule to reflect the deletion of the particular node.

18. The system of claim 14, wherein the code reviewer service includes further instructions that upon execution cause the code reviewer service to cause a display of one or more operations that can be performed on a particular edge upon selection of the particular edge in the first graph in the editor portion of the graphical user interface, wherein the one or more operations include at least one of a delete operation and an insert node option.

19. The system of claim 14, wherein the graphical user interface further includes a test case editor portion, the test case editor portion providing for entry of code against which the first code review rule can be evaluated.

20. The system of claim 19, wherein the code reviewer service includes further instructions that upon execution cause the code reviewer service to:
- receive an indication to run a first test case via the test case editor portion of the graphical user interface;
- determine whether a first sequence of operations in the first test case matches a second sequence of operations specified by the first code review rule; and
- causing the graphical user interface to display an indication of whether the first sequence of operations in the first test case matched a second sequence of operations specified by the first code review rule.

* * * * *